US012691857B2

(12) United States Patent
Yoo

(10) Patent No.: US 12,691,857 B2
(45) Date of Patent: Jul. 28, 2026

(54) BRAKE SYSTEM FOR CONTROLLING ELECTROMECHANICAL BRAKE AND METHOD THEREOF

(71) Applicant: HL MANDO CORPORATION, Pyeongtaek-si (KR)

(72) Inventor: Hyeokki Yoo, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 15 days.

(21) Appl. No.: 18/639,088

(22) Filed: Apr. 18, 2024

(65) Prior Publication Data

US 2025/0065856 A1      Feb. 27, 2025

(30) Foreign Application Priority Data

Aug. 21, 2023    (KR) ........................ 10-2023-0109352

(51) Int. Cl.
| | |
|---|---|
| *B60T 8/88* | (2006.01) |
| *B60T 8/1761* | (2006.01) |
| *B60T 8/1764* | (2006.01) |
| *B60T 8/58* | (2006.01) |
| *B60T 8/92* | (2006.01) |

(52) U.S. Cl.
CPC .......... *B60T 8/885* (2013.01); *B60T 8/17616* (2013.01); *B60T 8/1764* (2013.01); *B60T 8/58* (2013.01); *B60T 8/92* (2013.01); *B60T 2240/00* (2013.01); *B60T 2270/416* (2013.01)

(58) Field of Classification Search
CPC .... B60T 8/885; B60T 8/17616; B60T 8/1764;

B60T 8/58; B60T 8/92; B60T 2240/00; B60T 2270/416; B60T 17/221; B60T 7/042; B60T 13/74; B60T 2270/10; B60Y 2306/13; B60Y 2400/3032; B60Y 2400/81

See application file for complete search history.

(56) References Cited

FOREIGN PATENT DOCUMENTS

| | | | | |
|---|---|---|---|---|
| CN | 101925496 A | * | 12/2010 | .............. B60T 7/042 |
| DE | 102020213130 A1 | * | 4/2021 | ................ B60T 8/96 |
| KR | 10-1134908 B1 | | 4/2012 | |

(Continued)

OTHER PUBLICATIONS

Machine Translation of CN101925496A PDF File Name: "CN101925496A_Machine_Translation.pdf" (Year: 2010).*

(Continued)

*Primary Examiner* — Grant Moubry
*Assistant Examiner* — Ruben Picon-Feliciano
(74) *Attorney, Agent, or Firm* — Hauptman Ham, LLP

(57) ABSTRACT

A brake system may include: a first electro mechanical brake configured to brake a first wheel of a vehicle; a second electro mechanical brake configured to brake a second wheel of the vehicle; and a processor configured to output a signal for controlling the first electro mechanical brake and the second electro mechanical brake to brake the first wheel and the second wheel, in response to reception of a signal output from a pedal sensor of a brake pedal of the vehicle, wherein the processor may be configured to output, as a result of identifying that a first wheel speed sensor provided in the first wheel has failed, a signal for controlling the first electro mechanical brake to brake the first wheel in response to an elapse of a preset time after the reception of the signal output from the pedal sensor.

20 Claims, 11 Drawing Sheets

SPLIT MU ROAD SURFACE IS DETECTED

BRAKING FORCE

SECOND AND FOURTH WHEELS

FIRST AND THIRD WHEELS t1  t2        t3    TIME

TIME DELAY (a)

TIME DELAY

FIRST WHEEL - High side

THIRD WHEEL - Low side

SECOND WHEEL - High side

FOURTH WHEEL - Low side (b)

(56)          References Cited

FOREIGN PATENT DOCUMENTS

| KR | 10-1316160 | B1 | 10/2013 |
| KR | 101681417 | B1 * | 11/2016 | ............... B60T 8/92 |
| KR | 10-2018-0019441 | A | 2/2018 |
| KR | 10-2022-0057597 | A | 5/2022 |

OTHER PUBLICATIONS

Machine Translation of KR101681417B1 PDF File Name: "KR101681417B1_Machine_Translation.pdf" (Year: 2016).*
Machine Translation of DE102020213130A1 PDF File Name: "DE102020213130A1_Machine_Translation.pdf" (Year: 2021).*
Office Action issued on Jan. 16, 2026, for corresponding Korean Patent Application No. 10-2023-0109352, along with an English machine translation (12 pages).

* cited by examiner

Figure 2:
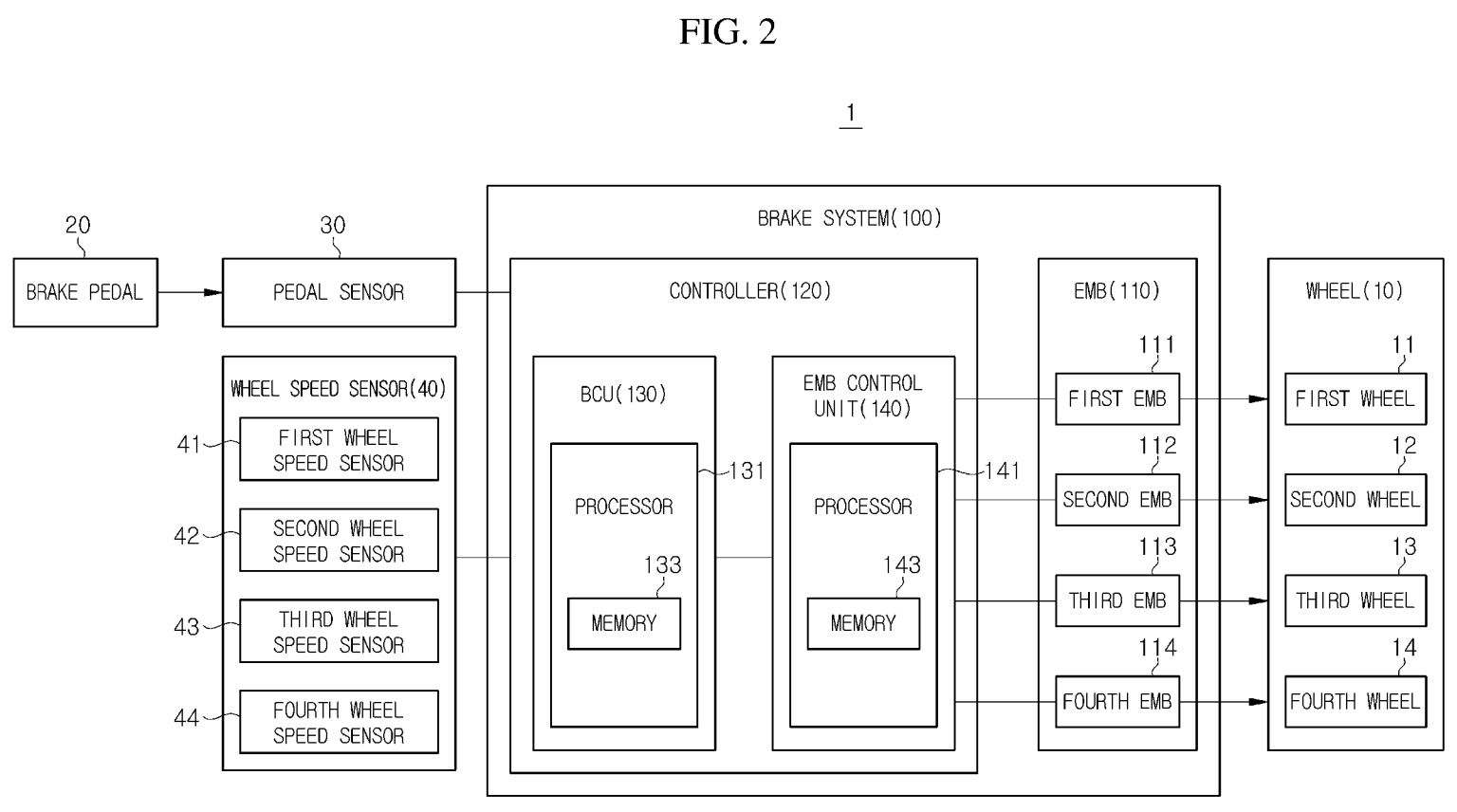

BRAKE SYSTEM(100)

WHEEL(10)

- FIRST WHEEL 11
- SECOND WHEEL 12
- THIRD WHEEL 13
- FOURTH WHEEL 14

EMB(110)

- FIRST EMB 111
- SECOND EMB 112
- THIRD EMB 113
- FOURTH EMB 114

CONTROLLER(120)

EMB CONTROL UNIT(140)

141

PROCESSOR

MEMORY 143

BCU(130)

131

PROCESSOR

MEMORY 133

30

PEDAL SENSOR

WHEEL SPEED SENSOR(40)

- FIRST WHEEL SPEED SENSOR 41
- SECOND WHEEL SPEED SENSOR 42
- THIRD WHEEL SPEED SENSOR 43
- FOURTH WHEEL SPEED SENSOR 44

20

BRAKE PEDAL

Figure 10:
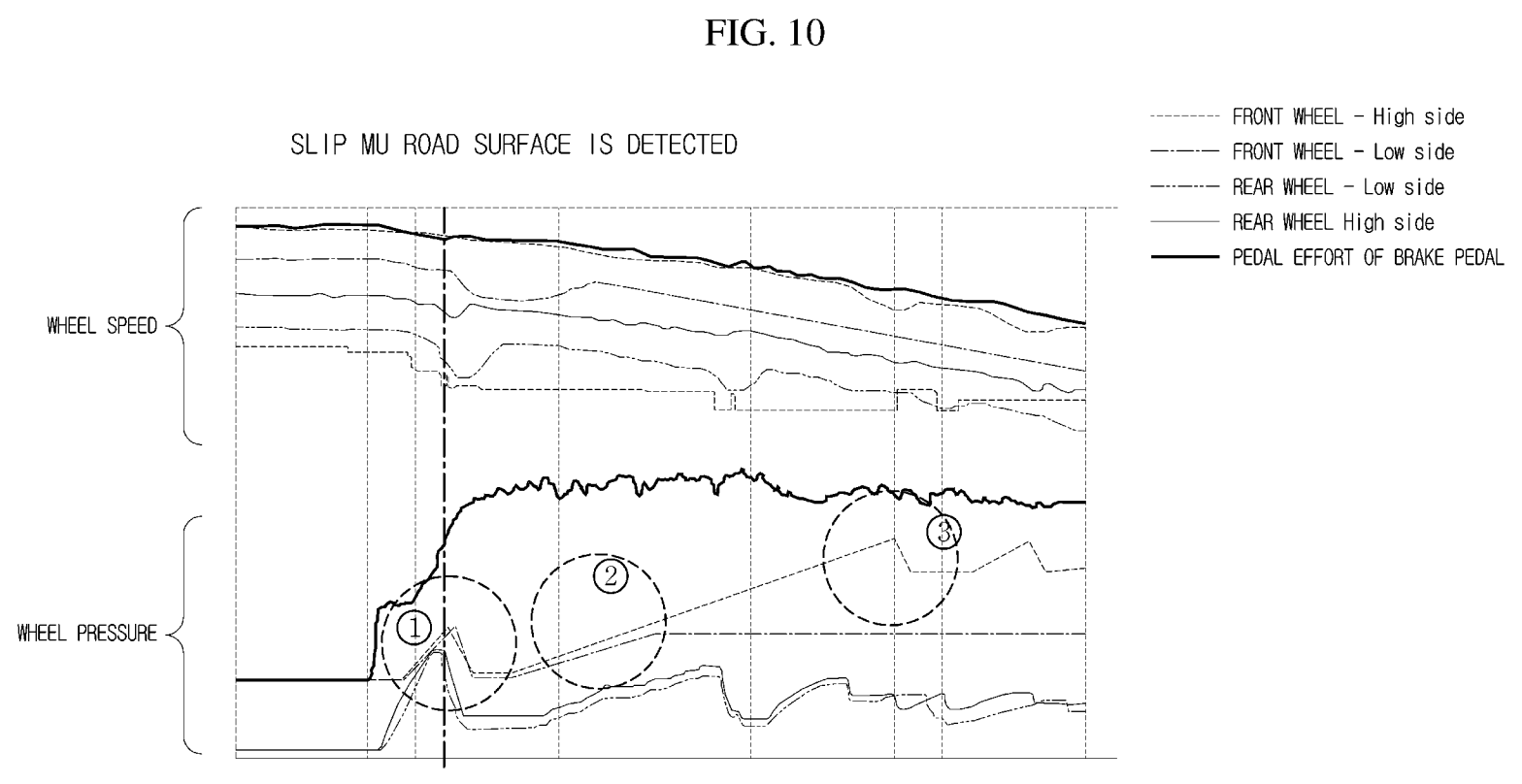

FRONT WHEEL — High side
FRONT WHEEL — Low side
REAR WHEEL — Low side
REAR WHEEL High side
PEDAL EFFORT OF BRAKE PEDAL

SLIP MU ROAD SURFACE IS DETECTED

WHEEL SPEED

WHEEL PRESSURE

BRAKE SYSTEM FOR CONTROLLING ELECTROMECHANICAL BRAKE AND METHOD THEREOF

CROSS-REFERENCE TO RELATED APPLICATION(S)

This application is based on and claims priority under 35 U.S.C. § 119 to Korean Patent Application No. 10-2023-0109352, filed on Aug. 21, 2023, in the Korean Intellectual Property Office, the disclosure of which is incorporated by reference herein in its entirety.

BACKGROUND

1. Field

The disclosure relates to a brake system and a control method thereof.

2. Description of the Related Art

To secure the stable performance of vehicle brake systems, an Anti-lock Brake System (ABS) has been applied to vehicles.

The ABS obtains speed information of the wheels from wheel speed sensors attached to the wheels to calculate a slip rate and then controls the wheels such that the calculated slip rate falls within a control range.

Conventional brake systems have had a problem that the ABS control does not operate when at least one of wheel speed sensors attached to the wheels has failed. The reason is because technology for improving the instability of ABS control on a Split_mu road surface when a wheel sensor has failed has not yet been developed.

SUMMARY

It is an aspect of the disclosure to provide a brake system for performing an Anti-lock Brake System (ABS) control through an Electro Mechanical Brake (EMB) according to a failure of at least one of wheel speed sensors attached to respective wheels of a vehicle, and a method of controlling the brake system.

Additional aspects of the disclosure will be set forth in part in the description which follows and, in part, will be obvious from the description, or may be learned by practice of the disclosure.

A brake system according to an aspect of the disclosure may include a first electro mechanical brake configured to brake a first wheel of a vehicle, a second electro mechanical brake configured to brake a second wheel of the vehicle, and a processor configured to output a signal for controlling the first electro mechanical brake and the second electro mechanical brake to brake the first wheel and the second wheel, in response to reception of a signal output from a pedal sensor of a brake pedal of the vehicle, wherein the processor may be configured to output, as a result of identifying that a first wheel speed sensor provided in the first wheel has failed, a signal for controlling the first electro mechanical brake to brake the first wheel in response to an elapse of a preset time after the reception of the signal output from the pedal sensor.

The processor may be configured to output, as a result of identifying that the first wheel speed sensor has failed, a signal for controlling the first electro mechanical brake to increase a braking force provided to the first wheel at a preset rate.

The brake system may further include a third electro mechanical brake configured to brake the third wheel located on the same axis as the first wheel, and a fourth electro mechanical brake configured to brake the fourth wheel located on the same axis as the second wheel, wherein the processor may be configured to output a signal for controlling the third electro mechanical brake and the fourth electro mechanical brake to brake the third wheel and the fourth wheel based on the signal output from the pedal sensor, and output a signal for controlling the third electro mechanical brake to increase, as a result of identifying that the first wheel speed sensor has failed, a braking force provided to the third wheel at the preset rate in response to the elapse of the preset time after the reception of the signal output from the pedal sensor.

The processor may be configured to identify occurrence of a wheel slip based on signals output from a second wheel speed sensor provided in the second wheel and a fourth wheel speed sensor provided in the fourth wheel, and output a signal for a braking control of the second wheel and the fourth wheel and a signal for a braking control of the first wheel and the third wheel based on the occurrence of the wheel slip.

The processor may be configured to identify whether a road surface on which the vehicle travels is a Split Mu road surface, based on the wheel slip, and output, according to a result of identifying that the road surface on which the vehicle travels is the Split Mu road surface, a signal for a braking control of the first wheel and the third wheel, based on at least one information of information about whether the first wheel is a front wheel or a rear wheel or information about whether the first wheel is located on a high side or a low side of the Split Mu road surface.

The processor may be configured to perform, according to a result of identifying that the first wheel is the front wheel, a control of decreasing a braking force of the first wheel and the third wheel at a preset first rate for a preset time period and then increasing the braking force of the first wheel and the third wheel at a preset second rate.

The processor may be configured to identify, according to a result of identifying that the first wheel is the front wheel and the first wheel is located on the high side, a first braking force corresponding to a road surface corresponding to the high side of the Split Mu road surface on which the second wheel or the fourth wheel is located, based on an output from the second wheel speed sensor or the fourth wheel speed sensor, increase a braking force of the first wheel to the first braking force at the preset second rate, then maintain the first braking force, and increase a braking force of the third wheel at the preset second rate, while providing a braking force for an anti-lock brake system control to the third wheel upon occurrence of a wheel slip.

The processor may be configured to identify, according to a result of identifying that the first wheel is the front wheel and the first wheel is located on the low side, a second braking force corresponding to a road surface corresponding to the low side of the Split Mu road surface on which the second wheel or the fourth wheel is located, based on an output from the second wheel speed sensor or the fourth wheel speed sensor, increase a braking force of the first wheel to the second braking force at the preset second rate, then maintain the second braking force, and increase a braking force of the third wheel at the preset second rate, while providing a braking force for an anti-lock brake system control to the third wheel upon occurrence of a wheel slip.

The processor may be configured to perform, according to a result of identifying that the first wheel is the rear wheel, a control of decreasing a braking force of the first wheel and the third wheel at a preset third rate for a preset time period and then increasing the braking force of the first wheel and the third wheel at a preset fourth rate.

The processor may be configured to identify, according to a result of identifying that the first wheel is the rear wheel, a third braking force corresponding to a road surface corresponding to the low side of the Split Mu road surface on which the second wheel or the fourth wheel is located, based on outputs from the second wheel speed sensor and the fourth wheel speed sensor, increase a braking force of the first wheel and the third wheel to the third braking force at the preset fourth rate, and then maintain the third braking force.

The processor may be configured to output, according to a result of identifying that the road surface on which the vehicle travels is not the Split Mu road surface, a signal for a braking control of the first wheel and the third wheel based on an average deceleration of the vehicle.

A method of controlling a brake system according to an aspect of the disclosure may include controlling a first electro mechanical brake configured to brake a first wheel of a vehicle and a second electro mechanical brake configured to brake a second wheel of the vehicle, in response to reception of a signal output from a pedal sensor of a brake pedal of the vehicle, identifying whether a first wheel speed sensor provided in the first wheel has failed, and controlling, as a result of identifying that the first wheel speed sensor has failed, the first electro mechanical brake to brake the first wheel, in response to an elapse of a preset time after the reception of the signal output from the pedal sensor.

The method may further include controlling, as the result of the identifying that the first wheel speed sensor has failed, the first electro mechanical brake to increase a braking force provided to the first wheel at a preset rate.

The method may further include controlling a third electro mechanical brake configured to brake a third wheel located on a same axis as the first wheel and a fourth electro mechanical brake configured to brake a fourth wheel located on a same axis as the second wheel, based on a signal output from the pedal sensor, and controlling, as the result of the identifying that the first wheel speed sensor has failed, the third electro mechanical brake to increase a braking force provided to the third wheel at the preset rate in respond to the elapse of the preset time after the reception of the signal output from the pedal sensor.

The method may further include identifying occurrence of a wheel slip based on signals output from a second wheel speed sensor provided in the second wheel and a fourth wheel speed sensor provided in the fourth wheel, controlling the second electro mechanical brake and the fourth electro mechanical brake for a braking control of the second wheel and the fourth wheel, based on the occurrence of the wheel slip, and controlling the first electro mechanical brake and the third electro mechanical brake for a braking control of the first wheel and the third wheel.

The method may further include identifying whether a road surface on which the vehicle travels is a Split Mu road surface, based on the wheel slip, wherein the controlling of the third electro mechanical brake and the fourth electro mechanical brake for the braking control of the first wheel and the third wheel may be performed based on at least one information of information about whether the first wheel is a front wheel or a rear wheel or information about whether the first wheel is located on a high side or a low side of the Split Mu road surface, according to a result of identifying that the road surface on which the vehicle travels is the Split Mu road surface.

The controlling of the third electro mechanical brake and the fourth electro mechanical brake for the braking control of the first wheel and the third wheel may include performing, as a result of identifying that the first wheel is the front wheel, a control of decreasing a braking force of the first wheel and the third wheel at a preset first rate for a preset time period and then increasing the braking force of the first wheel and the third wheel at a preset second rate, and the increasing of the braking force of the first wheel and the third wheel at the preset second rate may include identifying, as a result of identifying that the first wheel is located on the high side, a first braking force corresponding to a road surface corresponding to a high side of the Split Mu road surface on which the second wheel or the fourth wheel is located, based on an output from the second wheel speed sensor or the fourth wheel speed sensor, performing a control of increasing a braking force of the first wheel to the first braking force at the preset second rate and then maintaining the first braking force, and performing a control of increasing a braking force of the third wheel at the preset second rate, while providing a braking force for an anti-lock brake system control to the third wheel upon occurrence of a wheel slip.

The controlling of the third electro mechanical brake and the fourth electro mechanical brake for the braking control of the first wheel and the third wheel may include performing, as a result of identifying that the first wheel is the front wheel, a control of decreasing a braking force of the first wheel and the third wheel at a preset first rate for a preset time period and then increasing the braking force of the first wheel and the third wheel at a preset second rate, the performing of the control of increasing the braking force of the first wheel and the third wheel at the preset second rate may include identifying, as a result of identifying that the first wheel is located on the low side, a second braking force corresponding to a road surface corresponding to the low side of the Split road surface on which the second wheel or the fourth wheel is located, based on an output from the second wheel speed sensor or the fourth wheel speed sensor, performing a control of increasing a braking force of the first wheel to the second braking force at the preset second rate and maintaining the second braking force, and performing a control of increasing a braking force of the third wheel at the preset second rate, while providing a braking force for an anti-lock brake system control to the third wheel upon occurrence of a wheel slip.

The controlling of the third electro mechanical brake and the fourth electro mechanical brake for the braking control of the first wheel and the third wheel may include performing, as a result of identifying that the first wheel is the rear wheel, a control of decreasing a braking force of the first wheel and the third wheel at a preset third rate for a preset time period and then increasing the braking force of the first wheel and the third wheel at a preset fourth rate, the control of increasing the braking force of the first wheel and the third wheel at the preset fourth rate may include identifying a third braking force to be provided according to the road surface corresponding to the low side of the Split Mu road surface on which the second wheel or the fourth wheel is located, based on outputs from the second wheel speed sensor and the fourth wheel speed sensor, and performing a control of increasing the braking force of the first wheel and the third wheel to the third braking force at the preset fourth rate and then maintaining the third braking force.

The controlling of the third electro mechanical brake and the fourth electro mechanical brake for the braking control of the first wheel and the third wheel may be performed based on an average deceleration of the vehicle, as a result of identifying that the road surface on which the vehicle travels is not the Split Mu road surface.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 2 illustrates a configuration of a vehicle according to an embodiment;

FIG. 5 is a graph for describing an operation of a brake system according to a failure of a first wheel speed sensor according to an embodiment;

FIGS. 6A and 6B are flowcharts illustrating an operation of a brake system according to an embodiment;

FIG. 10 is a view for describing a braking control of a brake system when a wheel speed sensor provided in a front wheel located on a low side of a Split road surface has failed, according to an embodiment; and FIG. 11 is a view for describing a braking control of a brake system when a wheel speed sensor provided in a rear wheel has failed, according to an embodiment.

DETAILED DESCRIPTION

Figure 1:
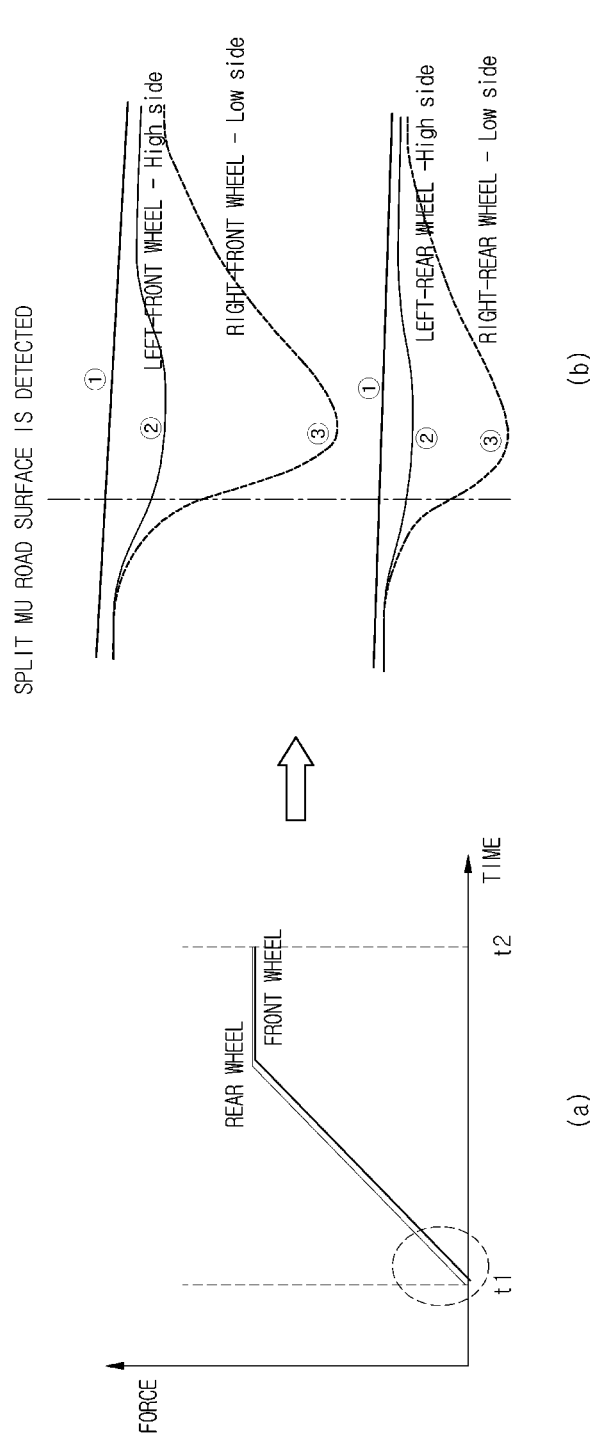
FIG. 1 is a view for describing an Anti-lock Brake System (ABS) control operation of a conventional brake system.

Like reference numerals refer to like components throughout the specification. This specification does not describe all the components of the embodiments, and duplicative contents between embodiments or general contents in the technical field of the present disclosure will be omitted. The terms 'part,' 'module,' 'member,' and 'block' used in this specification may be embodied as software or hardware, and it is also possible for a plurality of 'parts,' 'modules,' 'members,' and 'blocks' to be embodied as one component, or one 'part,' 'module,' 'member,' and 'block' to include a plurality of components according to embodiments.

Throughout the specification, when a part is referred to as being 'connected' to another part, it includes not only a direct connection but also an indirect connection, and the indirect connection includes connecting through a wireless network.

Also, when it is described that a part 'includes' a component, it means that the part may further include other components, not excluding the other components unless specifically stated otherwise.

Throughout the specification, when a member is described as being 'on' another member, this includes not only a case in which the member is in contact with the other member but also a case in which another member is present between the two members.

The terms first, second, etc. are used to distinguish one component from another component, and the components are not limited by the above-mentioned terms.

The singular forms 'a,' 'an,' and 'the' include plural referents unless the context clearly dictates otherwise.

In each operation, an identification numeral is used for convenience of explanation, the identification numeral does not describe the order of the operations, and each operation may be performed differently from the order specified unless the context clearly states a particular order.

FIG. 1 is a view for describing an Anti-lock Brake System (ABS) control operation of a conventional brake system.

Referring to (a) of FIG. 1, the conventional brake system may provide the same braking force to all front and rear wheels of a vehicle during a braking control of the vehicle. For example, the conventional brake system may increase a braking force of the front and rear wheels to a target braking force at a preset rate from a time t1, and then maintain the target braking force of the front and rear wheels until a time t2.

By providing the braking force to the front and rear wheels of the vehicle, a wheel slip may be generated, and the conventional brake system may detect a Split Mu road surface according to a detection of a wheel slip.

(b) of FIG. 1 is a view for describing slip changes of wheels of a vehicle on a Split Mu road surface, wherein the horizontal axis represents time and the vertical axis represents slip values.

For example, referring to (b) of FIG. 1, it is seen that, in a case ① in which a pedal effort applied to a brake pedal of the vehicle is little changed while the vehicle travels on a Split Mu road surface, a change ② in slip of a wheel located on a high side of the Split Mu road surface is not great compared to a change ③ in slip of a wheel located on a low side of the Split Mu road surface.

For example, when changes in slip of the wheels occur as shown in (b) of FIG. 1, the conventional brake system may identify that a left-front wheel and a left-rear wheel being in the state ② in which changes in wheel slip are not great are located on the high side and a right-front wheel and a right-rear wheel being in the state ③ in which changes in wheel slip are great are located on the low side.

The conventional brake system may perform an appropriate ABS control based on a detection of a Split Mu road surface and a determination on a condition of the Split Mu road surface.

Meanwhile, when any one of wheel speed sensors provided in the wheels of the vehicle has failed, the conventional brake system may detect occurrence of a wheel slip of the vehicle based on output signals from non-failed wheel speed sensors provided in the left and right wheels on the same axis.

Meanwhile, the conventional brake system has had a problem of not being able to predict a future state (or referred to as a future slip state) of a wheel equipped with a failed wheel speed sensor, which makes a braking control on the wheel equipped with the failed wheel speed sensor impossible.

In other words, the conventional brake system has had a problem of not being able to perform an ABS control according to occurrence of a wheel slip of the vehicle when any one of the wheel speed sensors provided in the respective wheels of the vehicle has failed.

Accordingly, the disclosure may provide a brake system capable of securing a braking force and stability of a vehicle and a control method thereof by solving the problem of the conventional brake system that performs, when at least one of the wheel speed sensors provided in the respective wheels of the vehicle has failed, only an Electronic Brakeforce Distribution (EBD) control without performing an ABS control.

Hereinafter, an operation principle and embodiments of the disclosure will be described with reference to the accompanying drawings.

Figure 3:
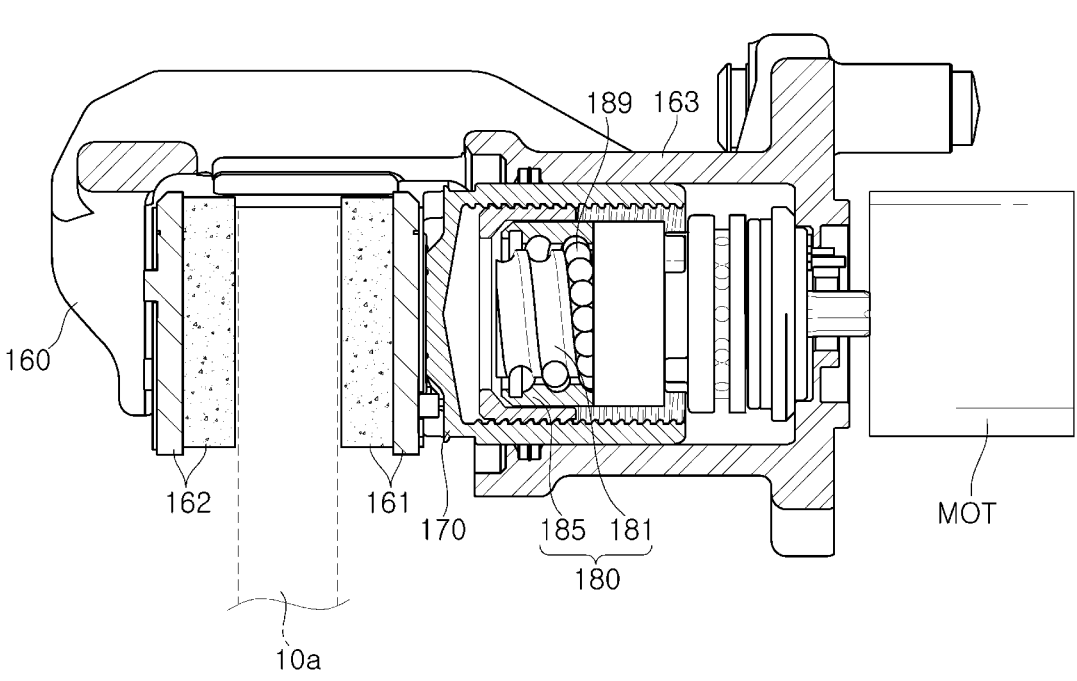
FIG. 3 illustrates an electro mechanical brake included in a vehicle according to an embodiment.

FIG. 2 illustrates a configuration of a vehicle according to an embodiment. FIG. 3 illustrates an electro mechanical brake included in a vehicle according to an embodiment.

Referring to FIG. 2, a vehicle 1 may include a wheel 10, a brake pedal 20, a pedal sensor 20, a wheel speed sensor 50, and/or a brake system 100.

The wheel 10 may rotate to move the vehicle 1, and may include a plurality of wheels, for example, a first wheel 11, a second wheel 12, a third wheel 13, and/or a fourth wheel 14.

The first wheel 11 and the third wheel 13 may be positioned on the same axis (or referred to as a vehicle axis), and the second wheel 12 and the fourth wheel 14 may also be positioned on the same axis.

For example, the first wheel 11 and the third wheel 13 may be front wheels, and the second wheel 12 and the fourth wheel 14 may be rear wheels.

The first wheel 11 and the third wheel 13 may be respectively provided (or installed) in front-left and front-right sides of the vehicle 1 or in the front-right and front-left sides of the vehicle 1. Also, the second wheel 12 and the fourth wheel 14 may be respectively provided in rear-left and rear-right sides of the vehicle 1 or in the rear-right and rear-left sides of the vehicle 1.

As another example, the first wheel 11 and the third wheel 13 may be rear wheels, and the second wheel 12 and the fourth wheel 14 may be front wheels.

The first wheel 11 and the third wheel 13 may be provided in the rear-left and rear-right sides of the vehicle 1 or in the rear-right and rear-left sides of the vehicle 1. Also, the second wheel 12 and the fourth wheel 14 may be provided in the front-left and front-right sides of the vehicle 1 or in the front-right and front-left sides of the vehicle 1.

The brake pedal 20 may obtain a driver's input for braking the vehicle 1.

For example, the brake pedal 20 may be provided in a lower space of a cabin to enable the driver to control the brake pedal 20 with his/her foot. The driver may step on the brake pedal 20 with a braking intention for braking the vehicle 1, and accordingly, the brake pedal 20 may move away from a reference position.

The pedal sensor 30 may detect a displacement of the brake pedal 20 or obtain displacement information of the brake pedal 20.

For example, the pedal sensor 30 may be physically connected to the brake pedal 20 to measure a movement of the brake pedal 20. The pedal sensor 30 may detect a movement distance and/or a movement speed of the brake pedal 20 from the reference position.

The pedal sensor 30 may be electrically connected to the brake system 100, and provide an electrical signal to the brake system 100.

For example, the pedal sensor 30 may be connected directly to the brake system 100 through a hard wire or to the brake system 100 through a communication network. The pedal sensor 30 may provide an electrical signal corresponding to a movement distance and/or a movement speed of the brake pedal 20 to the brake system 100. Alternatively, the pedal sensor 30 may be integrated into the brake system 100.

The wheel speed sensor 40 may detect a speed (or referred to as a rotation speed) of the wheel 10 of the vehicle 1.

The wheel speed sensor 40 may include a plurality of wheel speed sensors (for example, a first wheel speed sensor 41, a second wheel speed sensor 42, a third wheel speed sensor 43 and/or a fourth wheel speed sensor 44) provided (or installed) in the respective wheels 10 of the vehicle 1, and the first to fourth wheel speed sensors 41, 42, 43, and 44 may detect speeds of the corresponding wheels independently.

The first wheel speed sensor 41 may be provided in the first wheel 11 and output a signal corresponding to a rotation speed of the first wheel 11. The second wheel speed sensor 42 may be provided in the second wheel 12 and output a signal corresponding to a rotation speed of the second wheel 11. The third wheel speed sensor 43 may be provided in the third wheel 13 and output a signal corresponding to a rotation speed of the third wheel 13. The fourth wheel speed sensor 44 may be provided in the fourth wheel 14 and output a signal corresponding to a rotation speed of the fourth wheel 14.

The wheel speed sensor 40 may be electrically connected to the brake system 100, and provide an electrical signal to the brake system 100. Alternatively, the wheel speed sensor 40 may communicate with the brake system 100 and provide a communication signal to the brake system 100.

For example, the first wheel speed sensor 41, the second wheel speed sensor 42, the third wheel speed sensor 43, and the fourth wheel speed sensor 44 may be connected directly to the brake system 100 through a hard wire or to the brake system 100 through a communication network. Each of the first wheel speed sensor 41, the second wheel speed sensor 42, the third wheel speed sensor 43, and the fourth wheel speed sensor 44 may provide an electrical signal corresponding to a rotation speed of the corresponding wheel to the brake system 100.

The brake system 100 may include an Electro Mechanical Brake (EMB) 110 and/or a controller 120.

The EMB 110 may brake the vehicle 1 by braking the wheels 10.

The EMB 110 may include a plurality of EMBs (for example, a first EMB 111, a second EMB 112, a third EMB 113, and/or a fourth EMB 114) provided (or installed) in the respective wheels 10 of the vehicle 1, and the first to fourth EMBs 111, 112, 113, and 114 may brake the corresponding wheels, respectively.

The first EMB 111 may be provided in the first wheel 11 to brake the first wheel 11. The second EMB 112 may be provided in the second wheel 12 to brake the second wheel 12. The third EMB 113 may be provided in the third wheel 13 to brake the third wheel 13. The fourth EMB 114 may be provided in the fourth wheel 14 to brake the fourth wheel 14.

Each of the first to fourth EMBs 111, 112, 113, and 114 may operate based on a signal output from the controller 120, without mechanically or fluidly connecting to the brake pedal 20.

For example, each of the first to fourth EMBs 111, 112, 113, and 114 may include a caliper brake 150 as shown in FIG. 3.

The caliper brake 150 may include a pair of pad plates 161 and 162 installed to press a brake disc 10a rotating together with the first to fourth wheels 11, 12, 13, and 14, a caliper housing 160 that operates the pair of pad plates 161 and 162, a piston 170 installed inside the caliper housing 160 in such a way as to be movable back and forth, a power conversion unit 180 that receives a rotation driving force for moving the piston 170, converts the rotation driving force into a linear driving force, and transfers the linear driving force to the piston 170, and/or a brake motor MOT that generates a rotation driving force for moving the piston 170.

The piston 170 may be in a shape of a cup having an open rear side (right side in FIG. 2), and the piston 170 may be inserted into a cylinder 163 in such a way as to be slidingly movable inside the cylinder 163. Also, the piston 170 may press an inner pad plate 161 toward the brake disc 10a by receiving power through the power conversion unit 180.

The power conversion unit 180 may include a spindle 181 that rotates by receiving a driving force from the brake motor MOT, a nut 185 positioned inside the piston 170 and screwed to the spindle 181 to move forward together with the piston 170 by a rotation of the spindle 181 in a first direction or move back together with the piston 170 by a rotation of the spindle 181 in a second direction, and/or a plurality of balls 189 positioned between the spindle 181 and the nut 185. The power conversion unit 180 may be a ball-screw type conversion device for converting a rotation motion of the spindle 181 into a linear motion.

A rotation motion of the brake motor MOT may be converted into a linear motion of the piston 170 by the power conversion unit 180. The pair of pad plates 161 and 162 may be pressed to the brake disc 10a by a linear motion of the piston 170, and the wheels 11, 12, 13, and 14 may be braked by friction between the pair of pad plates 161 and 162 and the brake disc 10a.

FIG. 3 shows the caliper brake 150 as an example of an EMB. However, the EMB is not limited to the caliper brake 150.

Accordingly, although not shown in the drawings, each of the first to fourth EMBs 111, 112, 113, and 114 may include the brake motor MOT and a driving circuit for driving the brake motor MOT.

The first to fourth EMBs 111, 112, 113, and 114 may brake the first to fourth wheels 11, 12, 13, and 14, respectively, only depending on an operation of the brake motor MOT.

The controller 120 may receive an output signal from the pedal sensor 30 and/or the wheel speed sensor 40, and control the EMB 110 based on the output signal from the pedal sensor 30 and/or the wheel speed sensor 40.

The controller 120 may include a brake control unit (BCU) 130 and/or an EMB control unit 140.

The brake control unit 130 may include a processor 131.

The processor 131 may process an output signal from the pedal sensor and/or the wheel speed sensor 14, and output a signal for causing the EMB control unit 140 to control the EMB 110 based on the processed result of the output signal.

The processor 131 may detect a failure of each of the first to fourth wheel speed sensors 41, 42, 43, and 44, and provide the detected result to the EMB control unit 140.

The processor 131 may detect a failure of each of the first to fourth wheel speed sensors 41, 42, 43, and 44 through conventional wheel speed sensor failure detection technology. For example, the processor 131 may detect, based on a signal (for example, a pulse signal) received from each of the first to fourth wheel speed sensors 41, 42, 43, and 44, a failure of the corresponding wheel speed sensor.

The processor 131 may include a memory 133 that stores or memorizes programs and data for implementing operations of controlling components included in the brake system 100.

The memory 133 may provide the stored programs and data to the processor 131 and memorize temporary data generated during an operation of the processor 131.

For example, the memory 133 may include a volatile memory, such as Static Random Access Memory (S-RAM) and Dynamic Random Access Memory (D-RAM), and a non-volatile memory, such as Read Only Memory (ROM) and Erasable Programmable Read Only Memory (EPROM), Electrically erasable Programmable Read Only Memory (EEPROM), and flash memory.

The EMB control unit 140 may include a processor 141.

The processor 141 may output a signal for controlling the EMB 110 based on an output signal from the brake control unit 130, for example, the processor 131.

The processor 141 may control the first to fourth EMBs 111, 112, 113, and 114 independently to brake the first to fourth wheels 11, 12, 13, and 14 independently.

For example, the processor 141 may control the first to fourth EMBs 111, 112, 113, and 114 independently to adjust a time (that is, a braking control time) at which a braking force for each of the first to fourth wheels 11, 12, 13, and 14 is generated and a rate at which the braking force increases.

The processor 141 may control the first to fourth EMBs 111, 112, 113, and 114 independently, based on braking forces respectively corresponding to a plurality of preset road surface conditions (or referred to as decelerations), in such a way as to provide corresponding braking forces to the first to fourth wheels 11, 12, 13, and 14, respectively.

For example, the processor 141 may identify a corresponding road surface condition and a braking force corresponding to the road surface condition, based on the braking forces respectively corresponding to the plurality of preset road surface conditions, according to output signals from the first to fourth wheel speed sensors 41, 42, 43, and 44.

The processor 141 may receive information about failure occurrence or a normal operation of each of the first to fourth wheel speed sensors 41, 42, 43, and 44 from the processor 131.

When all of the first to fourth wheel speed sensors 41, 42, 43, and 44 operate normally without any failure, the processor 141 may control the first to fourth EMBs 111, 112, 113, and 114 such that the same braking control is applied to the first to fourth wheels 11, 12, 13, and 14.

For example, the processor 141 may control the first to fourth EMBs 111, 112, 113, and 114 such that the same braking force is applied to the first to fourth wheels 11, 12, 13, and 14 at the same braking control time. The processor 141 may control the first to fourth EMBs 111, 112, 113, and 114 such that the braking force is provided to the first to fourth wheels 11, 12, 13, and 14 in response to reception of a signal output from the pedal sensor 30.

According to a failure (or an abnormal operation) of at least a wheel speed sensor, for example, the first wheel speed sensor 41 of the first to fourth wheel speed sensors 41, 42, 43, and 44, the processor 141 may control the first to fourth EMBs 111, 112, 113, and 114 to apply, to the first wheel 11 equipped with the first wheel speed sensor 41 among the first to fourth wheels 11, 12, 13, and 14 and a wheel on the same axis as the first wheel 11, a different braking control from that applied to the remaining wheels.

According to a failure of at least one, for example, the first wheel speed sensor 41 of the first to fourth wheel speed sensors 41, 42, 43, and 44, the processor 141 may control the first and third EMBs 111 and 113 such that a braking force rise of the first wheel 11 and the third wheel 13 on the same axis as the first wheel 11 is different from a braking force rise of the second and fourth wheels 12 and 14.

Also, the processor 141 may control the first to fourth EMBs 111, 112, 113, and 114 to provide a braking force to the second and fourth wheels 12 and 14 prior to the first wheel 11 equipped with the failed first wheel speed sensor 41 and the third wheel 13 on the same axis.

For example, according to a detection of a failure of the first wheel speed sensor 41, the processor 141 may control, in response to reception of a signal output from the pedal sensor 30, the second and fourth EMBs 112 and 114 to provide (raise or increase) a braking force to the second and fourth wheels 12 and 14 respectively equipped with the second and fourth wheel speed sensors 42 and 44 operating normally, and the processor 141 may control, in response of an elapse of a time set in advance according to a test after receiving the signal output from the pedal sensor 30, the first and third EMBs 111 and 113 to provide a braking force increasing at a preset increase rate to the first and third wheels 11 and 13. At this time, increasing the braking force of the second and fourth wheels 12 and 14 may be controlled according to an inclination depending on the brake pedal 20 pressed by the driver, that is, an inclination based on the output signal from the pedal sensor 30.

For example, the processor 141 may delay a braking time of the first and third wheels 41 and 43 from that of the second and fourth wheels 42 and 44, while causing a braking force inclination according to a braking force increase of the first wheel 41 equipped with the failed wheel speed sensor 41 and the third wheel 43 on the same axis as the first wheel 41 to be lower than that of the other two wheels, that is, the second and fourth wheels 42 and 44.

For example, the processor 141 may apply, to the first and second wheels 11 and 13, a maximum time difference from a braking control time at which a braking force is provided to the second and fourth wheels 12 and 14, and apply, to the first and third wheels 11 and 13, a different inclination from that of a braking force provided to the second and fourth wheels 11 and 14, without greatly influencing a total braking force of the vehicle 1.

According to a failure of the first wheel speed sensor 41, the processor 141 may monitor slips of the second wheel 12 and the fourth wheel 14 and a difference between the slips of the second wheel 12 and the fourth wheel 14, based on results of monitoring of output signals from the second and fourth wheel speed sensors 42 and 44 that operate normally, to set braking forces that need to be provided to the respective wheels and identify whether a Split Mu control is required.

For example, when a road surface on which the vehicle 1 travels is a smooth road surface, the processor 141 may control the first EMB 111 to adjust a braking force of the first wheel 11 equipped with the failed first wheel speed sensor 41 to a braking force set in advance according to a test. Also, the processor 141 may control the third EMB 113 to provide the same braking force as that provided to the first wheel 11 to the third wheel 13.

When the road surface on which the vehicle 1 travels is a Split Mu road surface, the processor 141 may control the first and third EMBs 111 and 113 to provide a braking force according to a preset condition to the first wheel 11 equipped with the failed first wheel speed sensor 41 and the third wheel 13.

The processor 141 may include a memory 143 that stores or memorizes programs and data for implementing an operation of controlling components included in the EMB 110.

Figure 4:
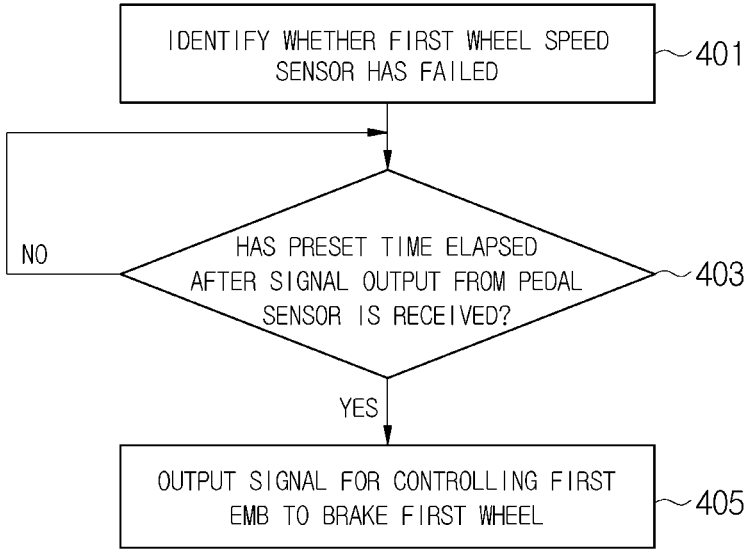
FIG. 4 is a flowchart illustrating an operation of a brake system according to an embodiment.

FIG. 4 is a flowchart illustrating an operation of the brake system 100 according to an embodiment.

Referring to FIG. 4, the brake system 100 (and/or the processor 131 and/or the processor 141) may identify whether the first wheel speed sensor 41 provided in the first wheel 11 has failed (401).

As a result of identifying that the first wheel sensor 41 has failed, the brake system 100 (and/or the processor 141) may identify whether a preset time has elapsed after a signal output from the pedal sensor 30 is received (operation 403).

As a result of identifying that the preset time has elapsed after the signal output from the pedal sensor 30 is received, the brake system 100 may perform operation 405, and otherwise, the brake system 100 may again perform operation 403.

As a result of identifying that the preset time has elapsed after the signal output from the pedal sensor 30 is received, the brake system 100 may output a signal for controlling the first EMB 111 to brake the first wheel 11 (operation 403).

While the brake system 100 controls the first to fourth EMBs 111, 112, 113, and 114 to provide braking forces to the first to fourth wheels 11, 12, 13, and 14 in response to reception of the signal output from the pedal sensor 30, the brake system 100 may control the first EMB 111 to increase a braking force that is provided to the first wheel 11 equipped with the failed first wheel speed sensor 41, at a preset rate, in response to an elapse of the preset time after the signal output from the pedal sensor 30 is received.

For example, as a result of identifying that the first wheel speed sensor 41 has failed, the brake system 100 may control a braking control time of the first wheel 11 to be delayed from a braking control time of wheels equipped with wheel speed sensors that operate normally, by a preset time.

For example, the wheels equipped with the wheel speed sensors that operate normally may include the second wheel 12 equipped with the second wheel speed sensor that is positioned on a different axis from that of the first wheel 11 and operates normally.

Also, as a result of identifying that the first wheel speed sensor 41 has failed, the brake system 100 may provide a braking force increasing at a preset rate to the first wheel 11.

Also, in addition to the above-described embodiment of FIG. 4, the brake system 100 may control, in response to an elapse of the preset time after the signal output from the pedal sensor 30 is received, the third EMB 113 to increase a braking force that is provided to the third wheel 13 located on the same axis as the first wheel 11, at the same rate as the preset rate applied to the first wheel 11.

Also, in addition to the above-described embodiment of FIG. 4, the brake system 100 may control, in response to reception of the signal output from the pedal sensor 30, the second EMB 112 and the fourth EMB 114 to provide a braking force to the second wheel 12 and the fourth wheel 14.

Also, in addition to the above-described embodiment of FIG. 4, the brake system 100 may detect a wheel slip based on signals output from the second and fourth wheel speed sensors 42 and 44 provided in the second and fourth wheels 12 and 14. According to a detection of a wheel slip, the brake system 100 may output a signal for a braking control of the second and fourth wheels 12 and 14 and a signal for a braking control of the first and third wheels 11 and 13 to the first to fourth EMBs 111, 112, 113, and 114.

For example, the brake system 100 may perform braking controls of the second and fourth wheels 12 and 14 based on output signals from the second and fourth wheel speed sensors 42 and 44.

Also, the brake system 100 may perform braking controls of the first and third wheels 11 and 13 based on whether or not a road surface on which the vehicle 1 travels is a Split Mu road surface.

As a result of identifying that the road surface on which the vehicle 1 travels is a Split Mu road surface, the brake system 100 may perform braking controls of the first and third wheels 11 and 13 based on information about whether the first wheel 11 is a front wheel or a rear wheel and/or whether the first wheel 11 is located on a high side or a low side of the Split Mu road surface.

As a result of identifying that the road surface on which the vehicle 1 travels is a smooth road surface, not a Split Mu road surface, the brake system 100 may perform braking controls of the first and third wheels 11 and 13 based on an average deceleration of the vehicle 1.

Figure 5:
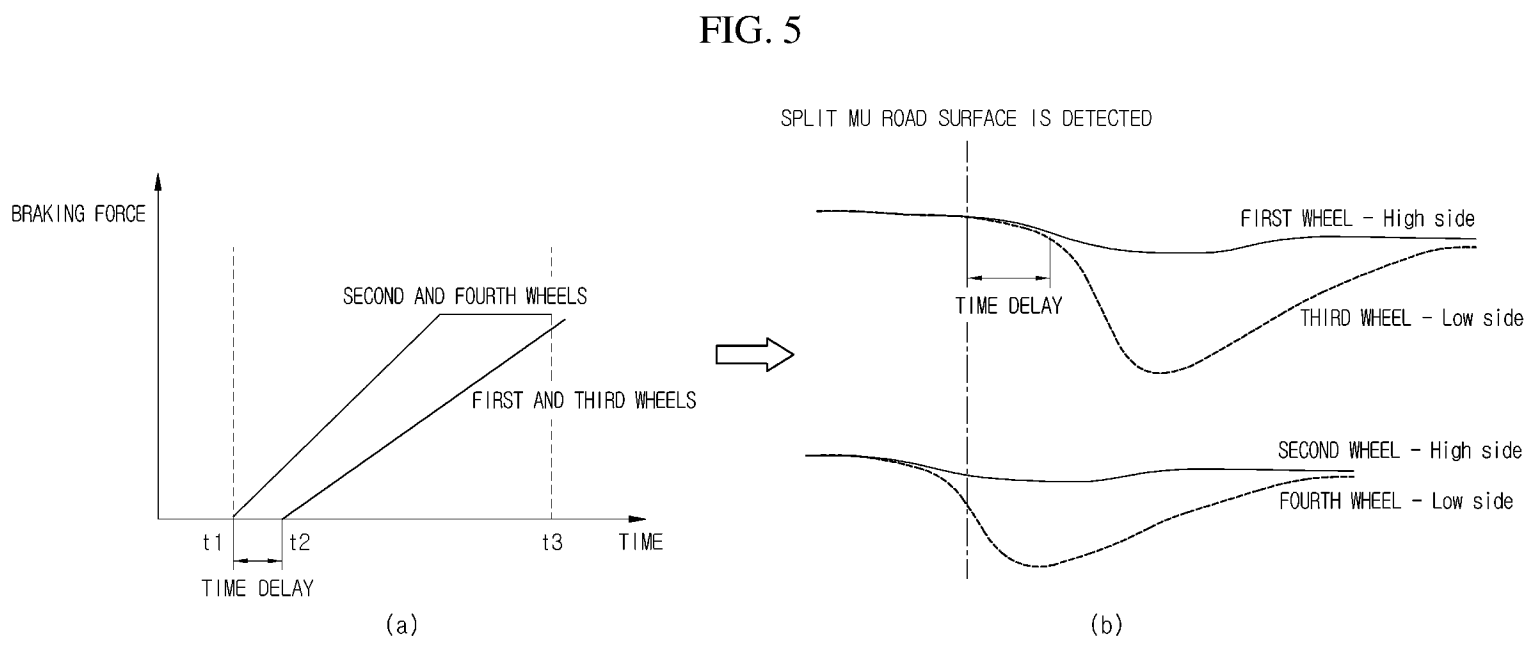

FIG. 5 is a graph for describing an operation of the brake system 100 according to a failure of the first wheel speed sensor 11 according to an embodiment.

Referring to FIG. 5, the brake system 100 may delay a braking control time of the first wheel 11 equipped with the failed first wheel speed sensor 41 and the third wheel 13 on the same axis as the first wheel 11 from a braking control time of the second wheel 12 and the fourth wheel 44 equipped with the second and fourth wheel speed sensors 42 and 44 that operate normally, by a preset time, as shown in (a) of FIG. 5.

In other words, the brake system 100 may output a control signal for braking the first wheel 11, in response to an elapse of a preset time after a signal output from the pedal sensor 30 is received.

For example, while a pedal effort is applied to the brake pedal 20 from a first time t1 to a third time t3, the brake system 100 may control the second and fourth EMBs 112 and 114 to provide a braking force to the second and fourth wheels 12 and 14 from the first time t1 based on an output signal from the pedal sensor 30.

Also, the brake system 100 may control the first and third EMBs 111 and 113 to provide a braking force to the first wheel 11 equipped with the failed first wheel speed sensor 41 and the third wheel 13 at a second time t2 delayed by a preset time from the first time t1. The braking force applied to the first wheel 11 and the third wheel 13 may be a braking force increasing at a different increase rate changed from a braking force increase rate of the second wheel 12 and the fourth wheel 14. For example, the brake system 100 may provide a braking force to the first and third wheels 11 and 13 such that a braking force inclination depending on a braking force increase of the first and third wheels 11 and 13 is lower than a braking force inclination depending on a braking force increase of the first and fourth wheels 12 and 14. A time delay for a braking control of the first wheel 11 equipped with the failed first wheel speed sensor 41 and the third wheel 13 on the same axis as the first wheel 11 may delay slip generation of the first wheel 11 and the third wheel 13, compared to slip generation of the second wheel 12 and the fourth wheel 14 on an axle equipped with wheel speed sensors that operate normally. Due to the delay of slip generation, the brake system 100 may first identify a slip state of the second wheel 12 and the fourth wheel 14.

For example, the brake system 100 may identify slip states of the second and fourth wheels 12 and 14 and a condition of a road surface on which the second and fourth wheels 12 and 14 are located, based on output signals of the second and fourth wheel speed sensors 42 and 44. This may be to identify a condition of a road surface on which the vehicle 1 travels based on wheel speeds of the second and fourth wheels 12 and 14 located on the same axis equipped with wheel speed sensors that have not failed.

Referring to (b) of FIG. 5, the brake system 100 may identify that the second wheel 12 is located on a low side that does not cause a great slip change and the fourth wheel 14 is located on a high side that causes a great slip change.

Thereafter, the brake system 100 may identify (or estimate) slip states of the first and third wheels 11 and 13 and/or a condition of a road surface on which the first and third wheels 11 and 13 are located, based on the slip states of the second and fourth wheels 12 and 14 and/or the condition of the road surface on which the second and fourth wheels 12 and 14 are located.

For example, in a case in which the first wheel 11 is located in the same side (left or right side) as the second wheel 12, the brake system 100 may identify a slip state of the first wheel 11 in advance, based on a time delay of a braking control time of the first and third wheels 11 and 13, a slip state of the second wheel 12, and a braking force provided to the first wheel 11. Because the braking force provided to the first wheel 11 is different from a braking force provided to the second wheel 12, a change form of a slip state of the first wheel 11 may be partially changed from a change form of a slip state of the second wheel 12.

Also, the brake system 100 may identify or estimate in advance that the first wheel 11 will be located on a high side.

Also, in a case in which the third wheel 13 is located in the same side (left or right side) as the fourth wheel 14, the brake system 100 may identify a slip state of the second wheel 12 in advance, based on a time delay of a braking control time of the first and third wheels 11 and 13, a slip state of the fourth wheel 14, and a braking force provided to the third wheel 13. Because the braking force provided to the third wheel 13 is different from a braking force provided to the fourth wheel 14, a change form of a slip state of the third wheel 13 may be partially changed from a change form of a slip state of the fourth wheel 14.

Also, the brake system 100 may identify or estimate in advance that the third wheel 13 will be located on a low side.

Accordingly, the brake system 100 may identify a braking force corresponding to the identified slip states of the first wheel 11 and the third wheel 13 and/or the identified condition of the road surface, based on the braking forces respectively corresponding to the plurality of road surface conditions set in advance through the test, and provide the corresponding braking force to the first wheel 11 and the third wheel 13.

Figure 6A:
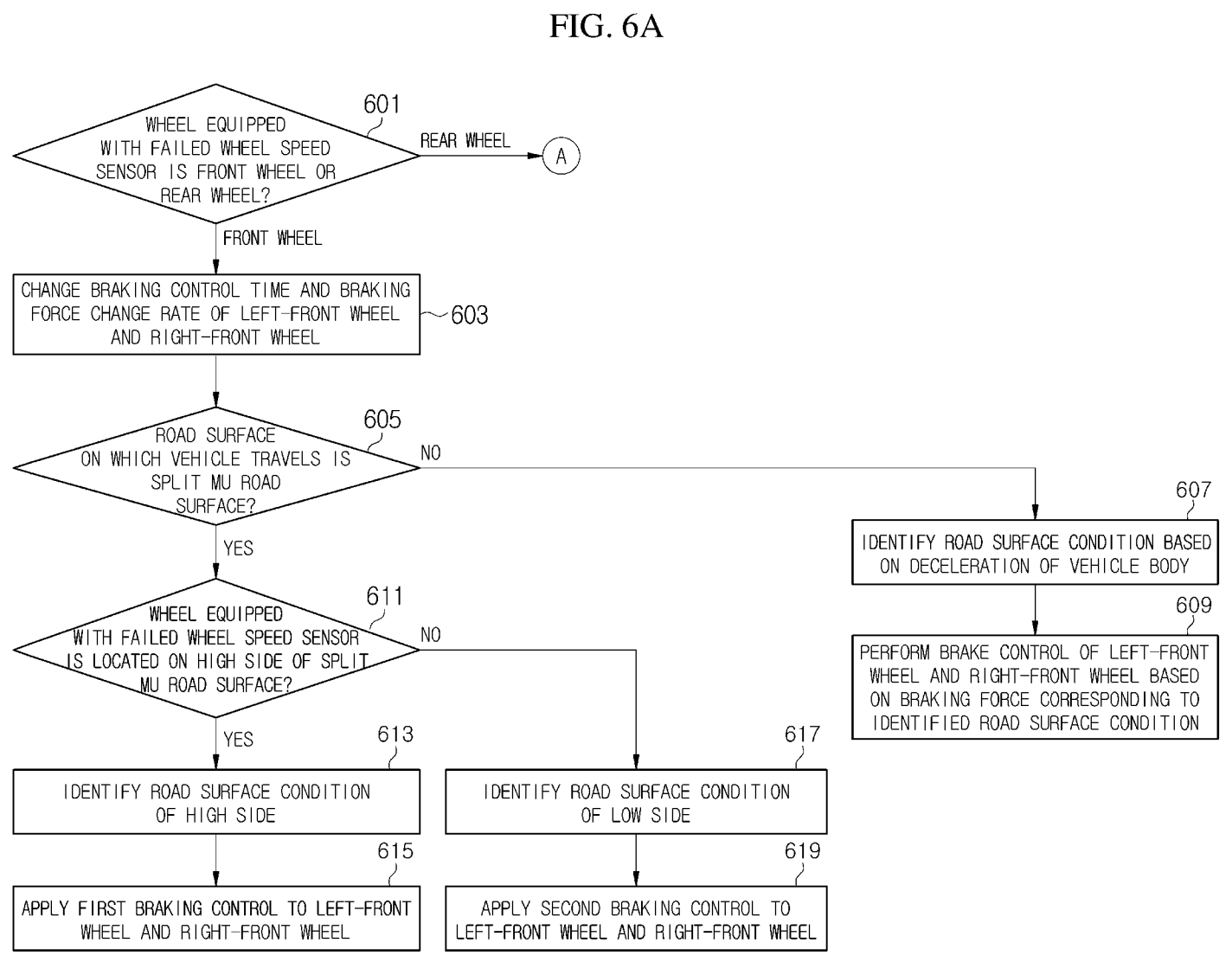
Figure 6B:
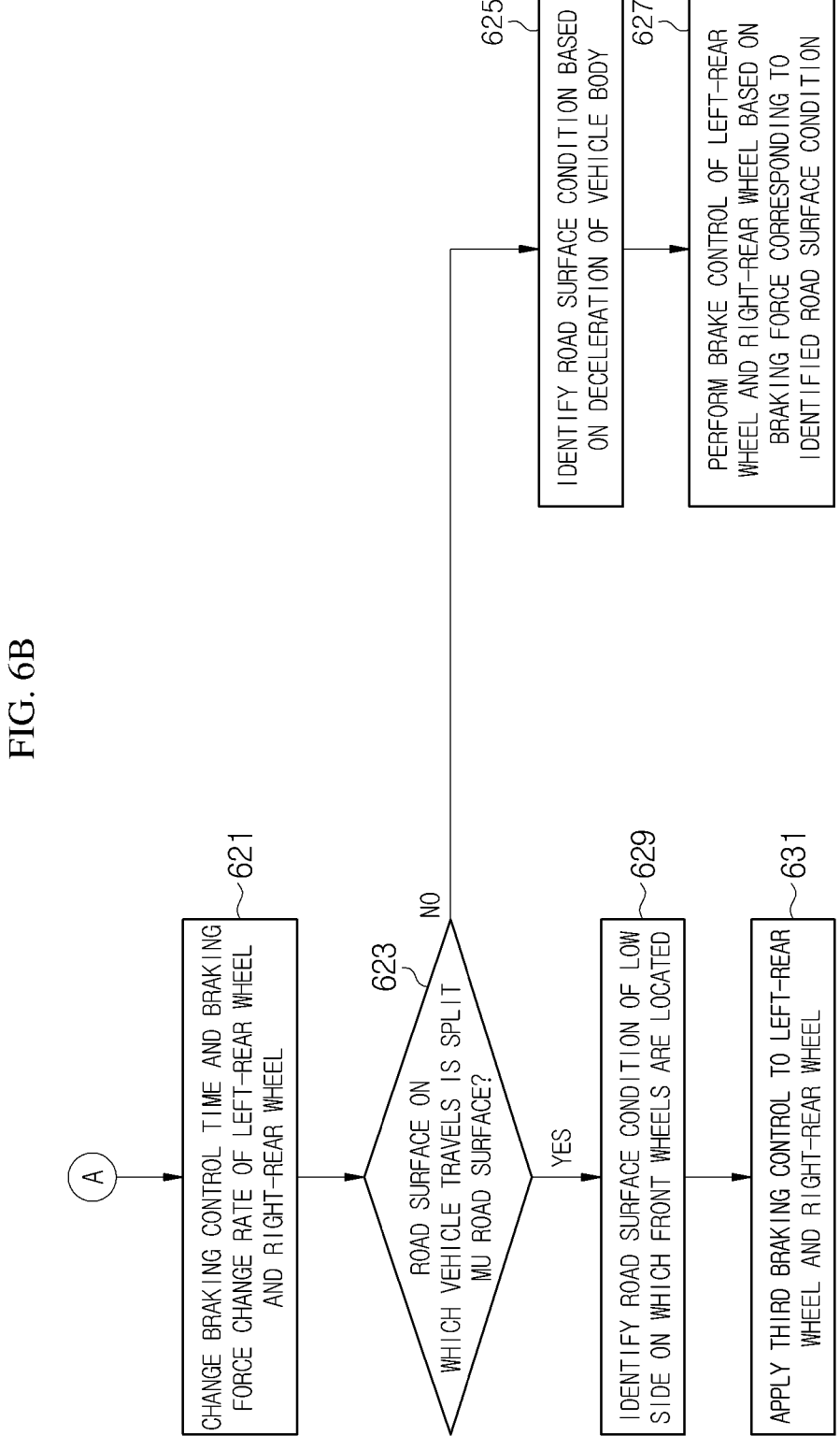

FIGS. 6A and 6B are flowcharts illustrating an operation of the brake system 100 (and/or the processor 141) according to an embodiment.

Referring to FIG. 6A, according to a failure of at least one of the first to fourth wheel speed sensors 41, 42, 43, and 44, the brake system 100 may identify whether a wheel equipped with the failed wheel speed sensor is the front wheel or the rear wheel of the vehicle (601).

As a result of identifying that the wheel equipped with the failed wheel speed sensor is the front wheel, the brake system 100 may perform operation 603, and otherwise, the brake system 100 may perform operation 621 of FIG. 6B.

The brake system 100 may change a braking control time and a braking force change rate of the left-front wheel and right-front wheel of the vehicle 1 (603).

The brake system 100 may change the braking control time and the braking force change rate of the left-front wheel and right-front wheel of the vehicle 1 such that the braking control time of the left-front wheel and right-front wheel is delayed by a preset time and a braking force increasing at a preset rate is applied to the left-front wheel and right-front wheel.

For example, the brake system 100 may output a control signal for braking the first wheel 11, in response to an elapse of a preset time after a signal output from the pedal sensor 30 is received, while increasing a braking force that is provided to the first wheel 11 by a preset rate.

The brake system 100 may identify whether a road surface on which the vehicle 1 travels is a Split Mu road surface (605).

The brake system 100 may identify whether the road surface on which the vehicle 1 travels is a Split Mu road surface, based on a result of comparison between slip states of the left-rear wheel and right-rear wheel of the vehicle 1.

For example, the brake system 100 may compare a slip state of the left-rear wheel of the vehicle 1 with a slip state of the right-rear wheel of the vehicle 1, based on output signals from the wheel speed sensor provided in the left-rear wheel and the wheel speed sensor provided in the right-rear wheel.

As a result of identifying that the road surface on which the vehicle 1 travels is a smooth road surface, not a Split road surface, the brake system 100 may perform operation 607, and as a result of identifying that the road surface on which the vehicle 1 travels is a Split Mu road surface, the brake system 100 may perform operation 611.

The brake system 100 may identify a road surface condition based on a deceleration of the vehicle body (607).

The brake system 100 may identify the deceleration of the vehicle 1 based on output signals from the wheel speed sensors that operate normally.

For example, the brake system 100 may identify a wheel operating at a highest speed based on output signals from the wheel speed sensors that operate normally, and identify the deceleration of the vehicle 1 based on the highest speed of the wheel.

The brake system 100 may identify a road surface condition corresponding to the deceleration of the vehicle 1, based on information about road surface conditions respectively corresponding to a plurality of preset decelerations.

The brake system 100 may perform a brake control of the left-front wheel and right-front wheel based on a braking force corresponding to the identified road surface condition (609).

The brake system 100 may identify a braking force corresponding to the identified road surface condition, based on information about braking forces respectively corresponding to a plurality of preset road surface conditions.

For example, the braking force corresponding to the identified road surface condition may be lower than a braking force that is provided to each wheel when the road surface condition is the same as a road surface condition identified according to a conventional ABS control.

The brake system 100 may control corresponding EMBs such that the identified braking force is provided to the left-front wheel and right-front wheel.

The brake system 100 may identify whether the wheel equipped with the failed wheel speed sensor is located on a high side of a Split Mu road surface (611).

When a rear wheel located in the same side as the wheel equipped with the failed wheel speed sensor is located on a high side of a Split Mu road surface, the brake system 100 may identify that the wheel equipped with the failed wheel speed sensor is located on the high side of the Split Mu road surface, and otherwise, the brake system 100 may identify that the wheel equipped with the failed wheel speed sensor is located on a low side of the Split Mu road surface.

The brake system 100 may identify whether the rear wheel located on the same side as the wheel equipped with the failed wheel speed sensor is located on the high side or low side of the Split Mu road surface, based on output signals from the wheel speed sensor of the left-rear wheel and the wheel speed sensor of the right-rear wheel.

When the wheel equipped with the failed wheel speed sensor is located on the high side of the Split Mu road surface, the brake system 100 may perform operation 613, and otherwise, the brake system 100 may perform operation 617.

The brake system 100 may identify a road surface condition of the high side (613).

The brake system 100 may identify the road surface condition of the high side, based on a condition of a road surface on which the rear wheel located in the same side as the wheel equipped with the failed wheel speed sensor is located, by the same method as in the above-described embodiment of FIG. 5.

The brake system 100 may output a control signal for applying a first braking control to the left-front wheel and right-front wheel based on the identified road surface condition of the high side (615).

The first braking control may include a control of decreasing a braking force of the left-front wheel and right-front wheel at a preset first rate and then increasing the braking force at a preset second rate, and increasing the braking force at the preset second rate may be applied in different ways to the wheel equipped with the failed wheel speed sensor and the other wheels.

The brake system 100 may perform a control of rapidly decreasing a braking force of the left-front wheel and right-front wheel at the preset first rate for a preset time period, thereby securing stability of the vehicle 1. Thereafter, the brake system 100 may perform a control of slowly increasing a braking force of the left-front wheel and right-front wheel at the preset second rate, wherein the braking force may be a level that is controllable by the driver.

For example, the brake system 100 may identify a first braking force corresponding to the identified road surface condition of the high side, based on the information about the braking forces respectively corresponding to the plurality of preset road surface conditions.

Also, the brake system 100 may increase a braking force of the wheel equipped with the failed wheel speed sensor between the left-front wheel and right-front wheel to the first braking force at the preset second rate, and then maintain the first braking force.

Also, the brake system 100 may increase a braking force of the wheel equipped with the wheel speed sensor that operates normally, between the left-front wheel and right-front wheel, at the preset second rate, while providing a braking force for ABS control upon occurrence of a wheel slip.

The brake system 100 may identify a road surface condition of the low side (617).

The brake system 100 may identify the road surface condition of the low side, based on a condition of a road surface on which a rear wheel located on the same side as the wheel equipped with the failed wheel speed sensor is located, by the same method as in the above-described embodiment of FIG. 5.

The brake system 100 may output a control signal for applying a second braking control, which will be described below, to the left-front wheel and right-front wheel, based on the identified road surface condition of the low side (619).

The second braking control may include a control of decreasing a braking force of the left-front wheel and right-front wheel at the preset first rate and then increasing the braking force at the preset second rate, and increasing the braking force at the preset second rate may be applied in different ways to the wheel equipped with the failed wheel speed sensor and the other wheels.

The brake system 100 may perform a control of rapidly decreasing a braking force of the left-front wheel and right-front wheel at the preset first rate for a preset time period, thereby securing stability of the vehicle 1. Thereafter, the brake system 100 may perform a control of slowly increasing a braking force of the left-front wheel and right-front wheel at the preset second rate, wherein the braking force may be a level that is controllable by the driver.

For example, the brake system 100 may identify a second braking force corresponding to the identified road surface condition of the low side, based on information about braking forces respectively corresponding to a plurality of preset road surface conditions with respect to the low side.

Also, the brake system 100 may perform a control of increasing a braking force of the wheel equipped with the failed wheel speed sensor, between the left-front wheel and the right-front wheel, to the second braking force, at the preset second rate, and then maintaining the second braking force.

Also, the brake system 100 may increase a braking force of the wheel equipped with the wheel speed sensor that operates normally, between the left-front wheel and right-front wheel, at the preset second rate, while providing a braking force for ABS control upon occurrence of a wheel slip.

Referring to FIG. 6B, the brake system 100 may change a braking control time and a braking force change rate of the left-rear wheel and right-rear wheel of the vehicle 1 (621).

The brake system 100 may change the braking control time and the braking force change rate of the left-rear wheel and right-rear wheel of the vehicle 1 such that the braking control time of the left-rear wheel and right-rear wheel is delayed by a preset time and a braking force increasing at a preset rate is applied to the left-rear wheel and right-rear wheel.

The brake system 100 may identify whether a road surface on which the vehicle 1 travels is a Split Mu road surface (623).

The brake system 100 may identify whether the road surface on which the vehicle 1 travels is a Split Mu road surface, based on a result of comparison between slip states of the left-front wheel and right-front wheel of the vehicle 1.

For example, the brake system 100 may compare a slip state of the left-front wheel of the vehicle 1 with a slip state of the right-front wheel of the vehicle 1, based on output signals from the wheel speed sensor provided in the left-front wheel and the wheel speed sensor provided in the right-front wheel.

As a result of identifying that the road surface on which the vehicle 1 travels is a smooth road surface, not a Split road surface, the brake system 100 may perform operation 625, and as a result of identifying that the road surface on which the vehicle 1 travels is a Split Mu road surface, the brake system 100 may perform operation 629.

The brake system 100 may identify a road surface condition based on a deceleration of the vehicle body (625).

The brake system 100 may identify the deceleration of the vehicle 1 based on output signals from the wheel speed sensors that operate normally.

For example, the brake system 100 may identify a wheel operating at a highest speed based on output signals from the wheel speed sensors that operate normally, and identify the deceleration of the vehicle 1 based on the highest speed of the wheel.

The brake system 100 may identify a road surface condition corresponding to the deceleration of the vehicle 1, based on the information about the road surface conditions respectively corresponding to the plurality of preset decelerations.

The brake system 100 may identify a road surface condition corresponding to the deceleration of the vehicle 1, based on the information about the road surface conditions respectively corresponding to the plurality of preset decelerations.

The brake system 100 may perform a brake control of the left-rear wheel and right-rear wheel based on a braking force corresponding to the identified road surface condition (627).

The brake system 100 may identify a braking force corresponding to the identified road surface condition based on the information about the braking forces respectively corresponding to the plurality of preset road surface conditions.

For example, the braking force corresponding to the identified road surface condition may have been set in advance to a value that is lower than a braking force provided to each wheel in the same road surface condition as the identified road surface condition, according to conventional ABS control.

The brake system 100 may control the corresponding EMBs such that the identified braking force is provided to the left-front wheel and right-front wheel.

The brake system 100 may identify a road surface condition of the low side on which the front wheels are located (629).

The brake system 100 may identify a road surface condition of the low side of the Split Mu road surface on which the left-front wheel or the right-front wheel are located, based on output signals from the wheel speed sensors provided in the front wheels.

The brake system 100 may output a control signal for applying a third braking control to the left-rear wheel and right-rear wheel based on the identified road surface condition of the low side (631).

The third braking control may include a control of decreasing a braking force of the left-front wheel and right-front wheel at a preset third rate and then increasing the braking force at a preset fourth rate.

That is, the brake system 100 may perform a control of rapidly decreasing a braking force of the left-rear wheel and right-rear wheel at the preset third rate for a preset time period, thereby securing stability of the vehicle 1. Thereafter, the brake system 100 may perform a control of slowly increasing a braking force of the left-rear wheel and right-rear wheel at the preset fourth rate, wherein the braking force may be a level that is controllable by the driver.

For example, the brake system 100 may identify a third braking force corresponding to the identified road surface condition of the low side, based on the information about the braking forces respectively corresponding to the plurality of road surface conditions. Also, the brake system 100 may perform a control of increasing a braking force of the left-rear wheel and right-rear wheel to the third braking force at the preset fourth rate and then maintaining the third braking force.

Figure 7:
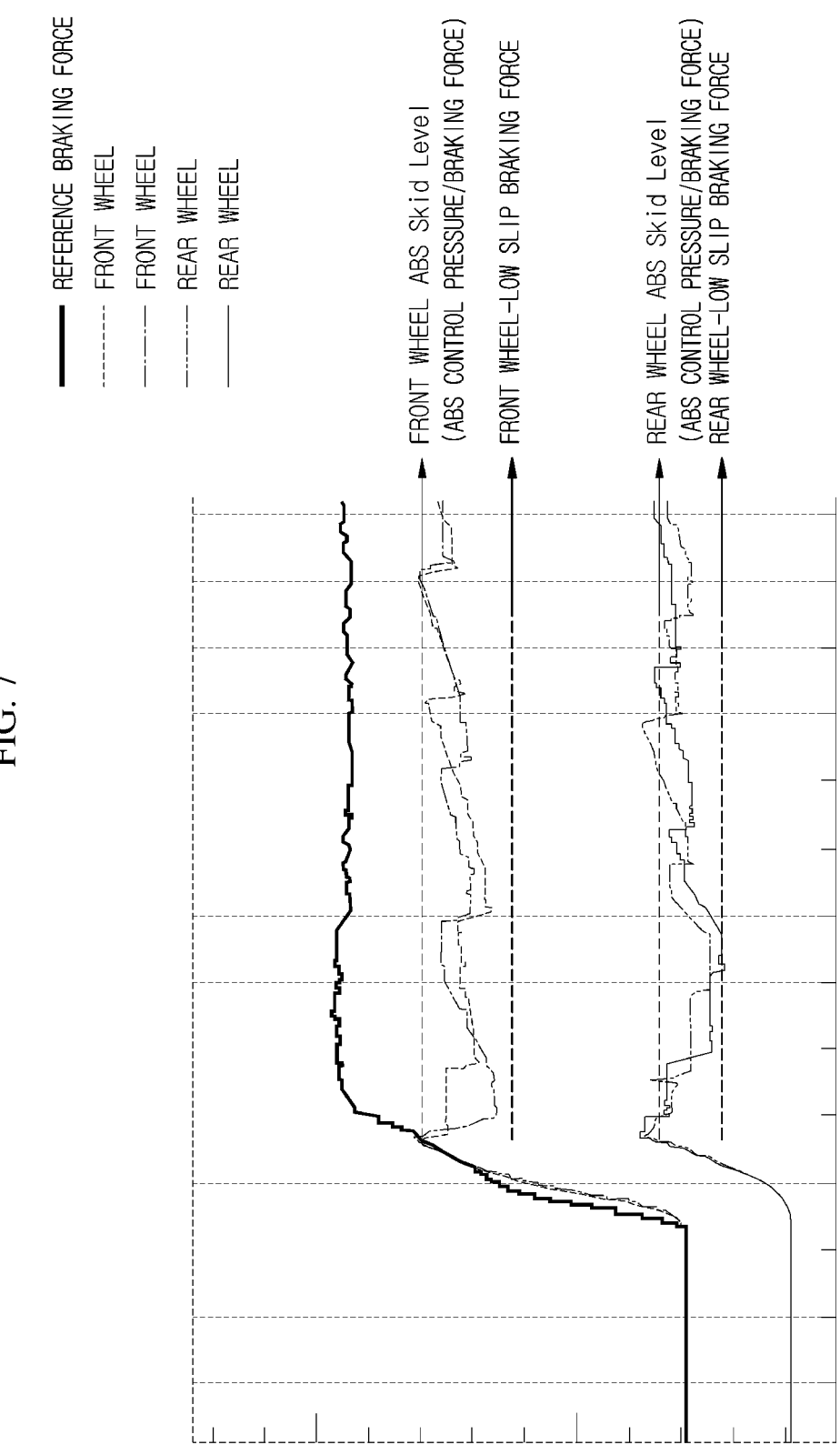
FIG. 7 is a graph for describing an operation of setting a braking force to be provided to a wheel including a failed wheel speed sensor and a wheel on the same axis as the wheel including the failed wheel speed sensor in a brake system according to an embodiment.

FIG. 7 is a graph for describing an operation of setting a braking force to be provided to a wheel including a failed wheel speed sensor and a wheel on the same axis as the wheel including the failed wheel speed sensor in the brake system 100 according to an embodiment. The horizontal axis of FIG. 7 represents time and the vertical axis of FIG. 7 represents braking forces.

When a driver steps on the brake pedal 20, the brake system 100 may identify a target braking force of the vehicle 1 based on an output signal from the pedal sensor 30. The brake system 100 may output a signal for controlling the first to fourth EMBs 111, 112, 113, and 114 such that a braking force of the first to fourth wheels 11, 12, 13, and 14 of the vehicle 1 increases to the identified target braking force at a preset rate and then the target braking force is maintained, to prevent one-sided braking of the vehicle 1 and secure braking security, as shown in FIG. 7.

Accordingly, as shown in FIG. 7, a braking force of each wheel may increase, and a wheel slip may occur while the braking force increases, and accordingly, an ABS control may be required.

When the brake system 100 provides the corresponding wheel with a braking force that is lower than a slip level (also referred to as an ABS skid level or ABS control pressure (or ABS braking force)) of ABS of each wheel, the corresponding wheel may be braked uniformly with a low braking force, without causing a slip having a great inclination.

Because an ABS control of a wheel of which a wheel slip state is not identified is impossible, the brake system 100 may provide the wheel equipped with the failed wheel speed sensor and the wheel located on the same axis as the wheel equipped with the failed wheel speed sensor with a braking force (or referred to an estimated braking force) to be provided for a braking control with a low slip rate, by referring to slips of two wheels on the same axis equipped with wheel sensors that operate normally.

For example, according to a failure of any wheel speed sensor provided in the front wheels of the vehicle 1, the brake system 100 may identify a preset low slip braking force of rear wheels, which is lower than an ABS Skid Level of rear wheels, as a braking force (or referred to as an estimated braking force) that is to be provided to the front wheels. Also, according to a failure of any wheel speed sensor provided in the rear wheels of the vehicle 1, the brake system 100 may identify a low slip braking force of front wheels, which is lower than an ABS Skid Level of front wheels, as a braking force (or referred to as an estimated braking force) that is to be provided to the rear wheels.

Figure 8:
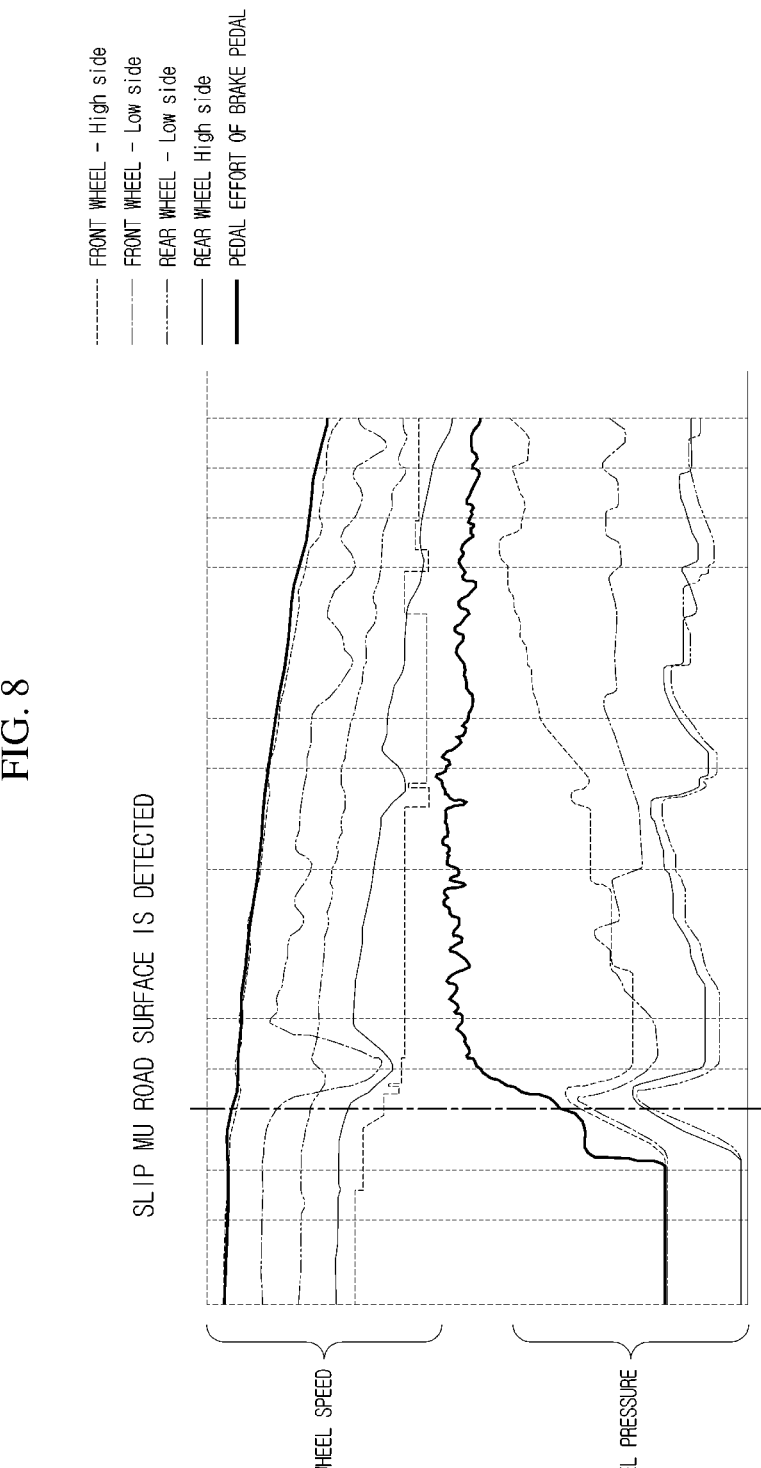
FIG. 8 is a view for describing a braking control of a brake system while all wheels operate normally, according to an embodiment.

FIG. 8 is a view for describing a braking control of the brake system 100 while all wheels operate normally, according to an embodiment. In FIG. 8, the horizontal axis represents time, and the vertical axis represents wheel speed and wheel pressure.

Referring to FIG. 8, the brake system 100 may provide the same braking force to all the wheels of the vehicle 1, according to a pedal effort applied to the brake pedal 20. Accordingly, pressure of all the wheels may increase at a constant rate, and speed of all the wheels may decrease at a constant rate. During such a braking control, the brake system 100 may perform an ABS control as a result of identifying that a road surface on which the vehicle 1 travels is a Split Mu road surface.

Figure 9:
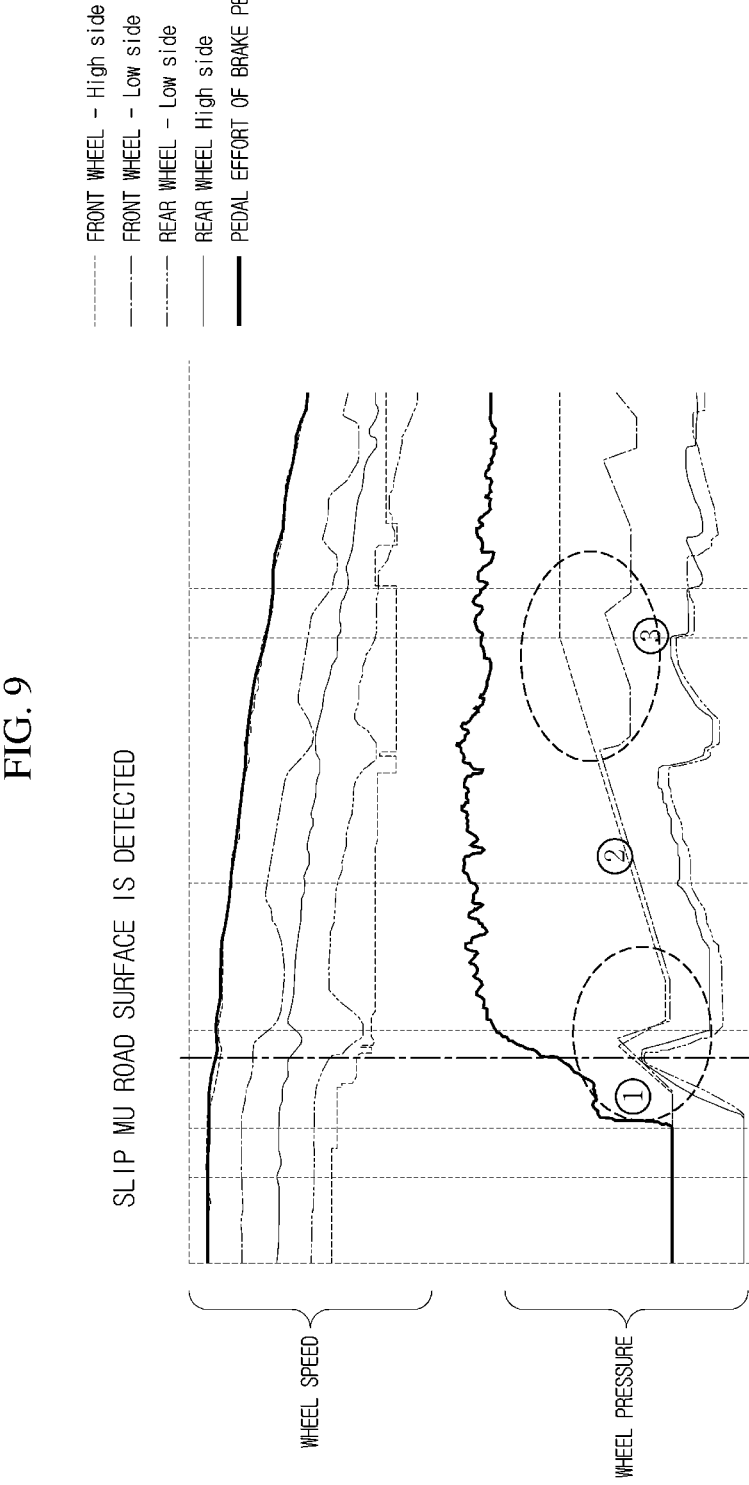
FIG. 9 is a view for describing a braking control of a brake system according to a failure of a wheel speed sensor provided in a front wheel located on a high side of a Split road surface, according to an embodiment.

FIG. 9 is a view for describing a braking control of the brake system 100 according to a failure of a wheel speed sensor provided in a front wheel located on a high side of a Split road surface, according to an embodiment. In FIG. 9, the horizontal axis represents time, and the vertical axis represents wheel speed and wheel pressure.

Referring to ① of FIG. 9, the brake system 100 may delay, upon a braking control according to a pedal effort applied to the brake pedal 20, a braking force control time of the left-front wheel and right-front wheel from a braking force control time of the left-rear wheel and right-rear wheel. Also, the brake system 100 may more slowly increase a braking force of the left-front wheel and right-front wheel than that of the left-rear wheel and right-rear wheel.

Thereafter, the brake system 100 may detect a Split Mu road surface based on slip states of the left-rear wheel and right-rear wheel, and decrease a braking force of the left-front wheel and right-front wheel for a preset time for safety of the vehicle 1. Thereafter, referring to ② of FIG. 9, the brake system 100 may increase a braking force of the left-front wheel and right-front wheel at the same inclination.

For example, the brake system 100 may provide a constant braking force to the front wheel equipped with the failed wheel speed sensor and located in the high side of the Split Mu road surface, through an estimated braking force control based on the wheel speed sensors of the rear wheels.

Also, referring to ③ of FIG. 9, upon occurrence of a wheel slip while the same braking force as that applied to the front wheel located on the high side is applied to the front wheel located on the low side, the brake system 100 may provide a braking force according to the conventional ABS control to the front wheel located on the low side.

FIG. 10 is a view for describing a braking control of the brake system 100 when a wheel speed sensor provided in a front wheel located on a low side of a Split road surface has failed, according to an embodiment. In FIG. 10, the horizontal side represents time, and the vertical side represents wheel speed and wheel pressure.

Referring to ① of FIG. 10, upon a braking control according to a pedal effort applied to the brake pedal 20, the brake system 100 may delay a braking force control time of the left-front wheel and right-front wheel from a braking force control time of the left-rear wheel and right-rear wheel. Also, the brake system 100 may more slowly increase a braking force of the left-front wheel and right-front wheel than that of the left-rear wheel and right-rear wheel.

Thereafter, the brake system 100 may detect a Split Mu road surface based on slip states of the left-rear wheel and right-rear wheel, and decrease a braking force of the left-front wheel and right-front wheel for a preset time for safety of the vehicle 1.

Thereafter, referring to ② of FIG. 10, the brake system 100 may increase the braking force of the left-front wheel and right-front wheel at the same inclination.

For example, the brake system 100 may provide a constant braking force to the front wheel equipped with the failed wheel speed sensor and located on the low side of the Split road surface through an estimated braking force control based on the wheel speed sensors of the rear wheels.

Referring to ③ of FIG. 10, upon occurrence of a wheel slip while the same braking force as that applied to the front wheel located on the high side is applied to the front wheel located on the low side, the brake system 100 may provide a braking force according to the conventional ABS control to the front wheel located on the low side.

Figure 11:
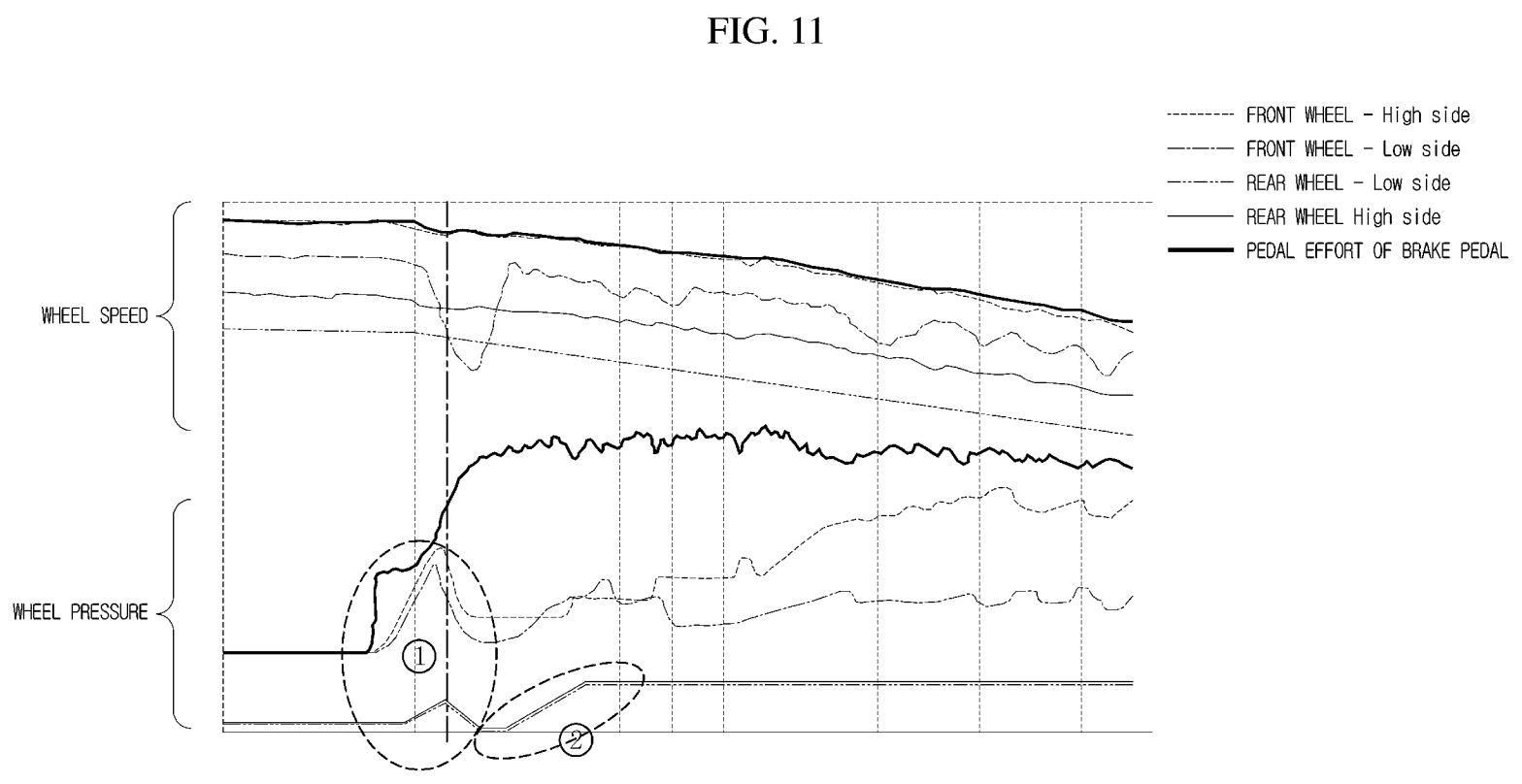

FIG. 11 is a view for describing a braking control of the brake system 100 according to a failure of a wheel speed sensor provided in a rear wheel, according to an embodiment. In FIG. 11, the horizontal axis represents time, and the vertical axis represents wheel speed and wheel pressure.

Referring to ① of FIG. 11, upon a braking control according to a pedal effort applied to the brake pedal 20, the brake system 100 may delay a braking force control time of the left-rear wheel and right-rear wheel from a braking force control time of the left-front wheel and right-front wheel. Also, the brake system 100 may more slowly increase a braking force of the left-rear wheel and right-rear wheel than that of the left-front wheel and right-front wheel.

Thereafter, the brake system 100 may detect a Split Mu road surface based on slip states of the left-front wheel and right-front wheel, and decrease a braking force of the left-front wheel and right-front wheel for a preset time for safety of the vehicle 1.

Thereafter, referring to ② of FIG. 11, the brake system 100 may increase a braking force of the left-rear wheel and right-rear wheel at the same inclination.

For example, the brake system 100 may perform a control of providing the same braking force as that for the low side of the Split Mu road surface to the left-rear wheel and right-rear wheel, for stability of the vehicle 1. That is, the brake system 100 may perform a control of providing a braking force corresponding to a road surface condition of the front wheel located on the low side to the left-rear wheel and right-rear wheel.

In other words, the brake system 100 may apply the same braking force to both the rear wheels located on the high side and low side of the Split Mu road surface.

The brake system 100 and the control method thereof according to the above-described embodiments may perform an ABS control through the EMBs upon a failure of at least one of the wheel speed sensors attached to the respective wheels of the vehicle.

Meanwhile, the disclosed embodiments may be implemented in the form of a recording medium that stores instructions executable by a computer. The instructions may be stored in the form of program codes, and when executed by a processor, the instructions may perform operations of the disclosed embodiments by generating a program module. The recording medium may be implemented as a computer-readable recording medium.

The computer-readable recording medium may include all kinds of recording media storing instructions that can be interpreted by a computer. For example, the computer-readable recording medium may be Read Only Memory (ROM), Random Access Memory (RAM), a magnetic tape, a magnetic disc, flash memory, an optical data storage device, etc.

A machine-readable storage medium may be provided in the form of a non-transitory storage medium, wherein the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

So far, the disclosed embodiments have been described with reference to the accompanying drawings. It will be understood by one of ordinary skill in the technical art to which the disclosure belongs that the disclosure can be embodied in different forms from the disclosed embodiments without changing the technical spirit and essential features of the disclosure. Thus, it should be understood that the disclosed embodiments described above are merely for illustrative purposes and not for limitation purposes in all aspects.

What is claimed is:

1. A brake system for controlling an electro mechanical brake, the brake system comprising:
   a first electro mechanical brake configured to brake a first wheel of a vehicle;
   a second electro mechanical brake configured to brake a second wheel that is positioned on a different axis from the first wheel of the vehicle; and
   a processor configured to output a signal for controlling the first electro mechanical brake and the second electro mechanical brake to brake the first wheel and the second wheel, in response to reception of a signal output from a pedal sensor of a brake pedal of the vehicle,
   wherein the processor is configured to output, as a result of identifying that a first wheel speed sensor provided in the first wheel has failed, a signal for controlling the first electro mechanical brake to brake the first wheel in response to an elapse of a preset time after the reception of the signal output from the pedal sensor, so as to brake the first wheel at a time delayed by the preset time from a braking control time of the second wheel equipped with a second wheel speed sensor that operates normally.

2. The brake system of claim 1, wherein the processor is configured to output, as a result of identifying that the first wheel speed sensor has failed, a signal for controlling the first electro mechanical brake to increase a braking force provided to the first wheel at a preset rate.

3. The brake system of claim 2, further comprising a third electro mechanical brake configured to brake a third wheel located on the same axis as the first wheel, and a fourth electro mechanical brake configured to brake a fourth wheel located on the same axis as the second wheel,
   wherein the processor is configured to
   output a signal for controlling the third electro mechanical brake and the fourth electro mechanical brake to brake the third wheel and the fourth wheel based on the signal output from the pedal sensor, and
   output a signal for controlling the third electro mechanical brake to increase, as a result of identifying that the first wheel speed sensor has failed, a braking force provided to the third wheel at the preset rate in response to the elapse of the preset time after the reception of the signal output from the pedal sensor.

4. The brake system of claim 1, wherein the processor is configured to
   identify occurrence of a wheel slip based on signals output from the second wheel speed sensor provided in the second wheel and a fourth wheel speed sensor provided in a fourth wheel, and
   output a signal for a braking control of the second wheel and the fourth wheel and a signal for a braking control of the first wheel and a third wheel based on the occurrence of the wheel slip.

5. The brake system of claim 4, wherein the processor is configured to
   identify whether a road surface on which the vehicle travels is a Split Mu road surface, based on the wheel slip, and
   output, according to a result of identifying that the road surface on which the vehicle travels is the Split Mu road surface, a signal for a braking control of the first wheel and the third wheel, based on at least one information of information about whether the first wheel is a front wheel or a rear wheel or information about whether the first wheel is located on a high side or a low side of the Split Mu road surface.

6. The brake system of claim 5, wherein the processor is configured to perform, according to a result of identifying that the first wheel is the front wheel, a control of decreasing a braking force of the first wheel and the third wheel at a preset first rate for a preset time period and then increasing the braking force of the first wheel and the third wheel at a preset second rate.

7. The brake system of claim 6, wherein the processor is configured to identify, according to a result of identifying that the first wheel is the front wheel and the first wheel is located on the high side, a first braking force corresponding to a road surface corresponding to the high side of the Split Mu road surface on which the second wheel or the fourth wheel is located, based on an output from the second wheel speed sensor or the fourth wheel speed sensor, increase a braking force of the first wheel to the first braking force at the preset second rate, then maintain the first braking force, and increase a braking force of the third wheel at the preset second rate, while providing a braking force for an anti-lock brake system control to the third wheel upon occurrence of a wheel slip.

8. The brake system of claim 6, wherein the processor is configured to identify, according to a result of identifying that the first wheel is the front wheel and the first wheel is located on the low side, a second braking force corresponding to a road surface corresponding to the low side of the Split Mu road surface on which the second wheel or the fourth wheel is located, based on an output from the second wheel speed sensor or the fourth wheel speed sensor, increase a braking force of the first wheel to the second braking force at the preset second rate, then maintain the second braking force, and increase a braking force of the third wheel at the preset second rate, while providing a braking force for an anti-lock brake system control to the third wheel upon occurrence of a wheel slip.

9. The brake system of claim 5, wherein the processor is configured to perform, according to a result of identifying that the first wheel is the rear wheel, a control of decreasing a braking force of the first wheel and the third wheel at a preset third rate for a preset time period and then increasing the braking force of the first wheel and the third wheel at a preset fourth rate.

10. The brake system of claim 9, wherein the processor is configured to identify, according to the result of identifying that the first wheel is the rear wheel, a third braking force corresponding to a road surface corresponding to the low side of the Split Mu road surface on which the second wheel or the fourth wheel is located, based on outputs from the second wheel speed sensor and the fourth wheel speed sensor, increase a braking force of the first wheel and the third wheel to the third braking force at the preset fourth rate, and then maintain the third braking force.

11. The brake system of claim 5, wherein the processor is configured to output, according to a result of identifying that the road surface on which the vehicle travels is not the Split Mu road surface, a signal for a braking control of the first wheel and the third wheel based on an average deceleration of the vehicle.

12. A method of controlling an electro mechanical brake, the method comprising:

controlling a first electro mechanical brake configured to brake a first wheel of a vehicle and a second electro mechanical brake configured to brake a second wheel that is positioned on a different axis from the first wheel of the vehicle, in response to reception of a signal output from a pedal sensor of a brake pedal of the vehicle;

identifying whether a first wheel speed sensor provided in the first wheel has failed; and controlling, as a result of identifying that the first wheel speed sensor has failed, the first electro mechanical brake to brake the first wheel, in response to an elapse of a preset time after the reception of the signal output from the pedal sensor, so as to brake the first wheel at a time delayed by the preset time from a braking control time of the second wheel equipped with a second wheel speed sensor that operates normally.

13. The method of claim 12, further comprising controlling, as the result of the identifying that the first wheel speed sensor has failed, the first electro mechanical brake to increase a braking force provided to the first wheel at a preset rate.

14. The method of claim 13, further comprising:

controlling a third electro mechanical brake configured to brake a third wheel located on a same axis as the first wheel and a fourth electro mechanical brake configured to brake a fourth wheel located on a same axis as the second wheel, based on a signal output from the pedal sensor; and controlling, as the result of the identifying that the first wheel speed sensor has failed, the third electro mechanical brake to increase a braking force provided to the third wheel at the preset rate in respond to the elapse of the preset time after the reception of the signal output from the pedal sensor.

15. The method of claim 12, further comprising:

identifying occurrence of a wheel slip based on signals output from the second wheel speed sensor provided in the second wheel and a fourth wheel speed sensor provided in a fourth wheel; and controlling the second electro mechanical brake and the fourth electro mechanical brake for a braking control of the second wheel and the fourth wheel, based on the occurrence of the wheel slip, and controlling the first electro mechanical brake and the third electro mechanical brake for a braking control of the first wheel and a third wheel.

16. The method of claim 15, further comprising identifying whether a road surface on which the vehicle travels is a Split Mu road surface, based on the wheel slip, wherein the controlling of the first electro mechanical brake and the third electro mechanical brake for the braking control of the first wheel and the third wheel is performed based on at least one information of information about whether the first wheel is a front wheel or a rear wheel or information about whether the first wheel is located on a high side or a low side of the Split Mu road surface, according to a result of identifying that the road surface on which the vehicle travels is the Split Mu road surface.

17. The method of claim 16, wherein the controlling of the first electro mechanical brake and the third electro mechanical brake for the braking control of the first wheel and the third wheel comprises performing, as a result of identifying that the first wheel is the front wheel, a control of decreasing a braking force of the first wheel and the third wheel at a preset first rate for a preset time period and then increasing the braking force of the first wheel and the third wheel at a preset second rate, and the increasing of the braking force of the first wheel and the third wheel at the preset second rate comprises:

identifying, as a result of identifying that the first wheel is located on the high side, a first braking force corresponding to a road surface corresponding to a high side of the Split Mu road surface on which the second wheel or the fourth wheel is located, based on an output from the second wheel speed sensor or the fourth wheel speed sensor;

performing a control of increasing a braking force of the first wheel to the first braking force at the preset second rate and then maintaining the first braking force; and performing a control of increasing a braking force of the third wheel at the preset second rate, while providing a braking force for an anti-lock brake system control to the third wheel upon occurrence of a wheel slip.

18. The method of claim 16, wherein the controlling of the first electro mechanical brake and the third electro mechanical brake for the braking control of the first wheel and the third wheel comprises:

performing, as a result of identifying that the first wheel is the front wheel, a control of decreasing a braking force of the first wheel and the third wheel at a preset first rate for a preset time period and then increasing the braking force of the first wheel and the third wheel at a preset second rate, the performing of the control of increasing the braking force of the first wheel and the third wheel at the preset second rate comprises:

identifying, as a result of identifying that the first wheel is located on the low side, a second braking force corresponding to a road surface corresponding to the low side of the Split road surface on which the second wheel or the fourth wheel is located, based on an output from the second wheel speed sensor or the fourth wheel speed sensor;

performing a control of increasing a braking force of the first wheel to the second braking force at the preset second rate and maintaining the second braking force; and performing a control of increasing a braking force of the third wheel at the preset second rate, while providing a braking force for an anti-lock brake system control to the third wheel upon occurrence of a wheel slip.

19. The method of claim 16, wherein the controlling of the first electro mechanical brake and the third electro mechanical brake comprises performing, as a result of identifying that the first wheel is the rear wheel, a control of decreasing a braking force of the first wheel and the third wheel at a preset third rate for a preset time period and then increasing the braking force of the first wheel and the third wheel at a preset fourth rate, the control of increasing the braking force of the first wheel and the third wheel at the preset fourth rate comprises:

identifying a third braking force to be provided according to the road surface corresponding to the low side of the Split Mu road surface on which the second wheel or the fourth wheel is located, based on outputs from the second wheel speed sensor and the fourth wheel speed sensor; and performing a control of increasing the braking force of the first wheel and the third wheel to the third braking force at the preset fourth rate and then maintaining the third braking force.

20. The method of claim 16, wherein the controlling of the first electro mechanical brake and the third electro mechanical brake for the braking control of the first wheel and the third wheel is performed based on an average deceleration of the vehicle, as a result of identifying that the road surface on which the vehicle travels is not the Split Mu road surface.

* * * * *